(12) United States Patent
Tsubota et al.

(10) Patent No.: US 11,815,764 B2
(45) Date of Patent: Nov. 14, 2023

(54) LIGHT SOURCE DEVICE AND DISPLAY DEVICE HAVING LIGHT SOURCE DEVICE

(71) Applicant: Japan Display Inc., Tokyo (JP)

(72) Inventors: Toshiyuki Tsubota, Tokyo (JP); Ken Sugiyama, Tokyo (JP); Rina Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 277 days.

(21) Appl. No.: 17/610,960

(22) PCT Filed: Mar. 23, 2020

(86) PCT No.: PCT/JP2020/012651
§ 371 (c)(1),
(2) Date: May 19, 2022

(87) PCT Pub. No.: WO2020/209038
PCT Pub. Date: Oct. 15, 2020

(65) Prior Publication Data
US 2022/0276532 A1  Sep. 1, 2022

(30) Foreign Application Priority Data

Apr. 12, 2019 (JP) ................................ 2019-076315

(51) Int. Cl.
*G02F 1/00* (2006.01)
*G02F 1/13357* (2006.01)
(52) U.S. Cl.
CPC .. *G02F 1/133608* (2013.01); *G02F 1/133603* (2013.01); *G02F 1/133606* (2013.01)
(58) Field of Classification Search
None
See application file for complete search history.

(56) References Cited

U.S. PATENT DOCUMENTS

| | | | |
|---|---|---|---|
| 2008/0055518 A1* | 3/2008 | Jung | G02B 6/0055 349/67 |
| 2008/0111949 A1* | 5/2008 | Shibata | G02F 1/133606 349/64 |

(Continued)

FOREIGN PATENT DOCUMENTS

| | | | |
|---|---|---|---|
| JP | 2010114406 A | 5/2010 | |
| JP | 2011100648 A | 5/2011 | |

(Continued)

OTHER PUBLICATIONS

International Search Report in Application No. PCT/JP2020/012651, dated Jun. 9, 2020.

*Primary Examiner* — Gerald J Sufleta, II
(74) *Attorney, Agent, or Firm* — K&L Gates LLP

(57) ABSTRACT

To provide a light source device capable of irradiating a liquid crystal display module with light at uniform luminance and a display device including the light source device. A light source device has a rear vessel a front cover, a light source substrate, a plurality of light-emitting diodes, and a light-diffusing plate. The front cover is located over and overlaps the rear vessel. The light source substrate, the plurality of light-emitting diodes, and the light-diffusing plate are accommodated between the rear vessel and the front cover. The plurality of light-emitting diodes is located over the light source substrate. The light-diffusing plate is located over, overlaps, and is spaced away from the plurality of light-emitting diodes. The rear vessel and the front cover each have a bottom plate and a side plate integrated with the bottom plate. In at least one of the rear vessel and the front cover, a portion of the side plate is bent to form a protruding portion overlapping the bottom plate. The light-diffusing plate is located over and overlaps the protruding portion.

20 Claims, 20 Drawing Sheets

(56) References Cited

U.S. PATENT DOCUMENTS

| | | |
|---|---|---|
| 2011/0109814 A1 | 5/2011 | Takemura |
| 2014/0368768 A1 | 12/2014 | Sakai |
| 2019/0025651 A1* | 1/2019 | Sugiyama ......... G02F 1/133605 |
| 2019/0196088 A1* | 6/2019 | Sim ................... G02F 1/133615 |
| 2020/0081296 A1* | 3/2020 | Ma .................... G02F 1/133615 |
| 2020/0089051 A1* | 3/2020 | Watanabe ......... G02F 1/133345 |

FOREIGN PATENT DOCUMENTS

| | | |
|---|---|---|
| JP | 2012104731 A | 5/2012 |
| JP | 2013143240 A | 7/2013 |
| JP | 2017173785 A | 9/2017 |
| JP | 2018106972 A | 7/2018 |

* cited by examiner

LIGHT SOURCE DEVICE AND DISPLAY DEVICE HAVING LIGHT SOURCE DEVICE

TECHNICAL FIELD

An embodiment of the present invention relates to a light source device for a liquid crystal display module and a display device including the light source device.

BACKGROUND ART

As one of the currently most commonly used display devices, a liquid crystal display device is represented. A liquid crystal display device includes, as fundamental elements, a light source device (backlight) and a liquid crystal display module arranged over the light source device. A cold cathode tube and a light-emitting diode (LED) including an inorganic compound as an emitter are used as a light source of the light source device. For example, Patent Literature 1 to 3 each disclose a liquid crystal display device including a light source device in which a plurality of light-emitting diodes is arranged to overlap a liquid crystal display module.

CITATION LIST

Patent Literature

Patent Literature 1: Japanese Patent Application Publication No. 2013-143240
Patent Literature 2: Japanese Patent Application Publication No. 2017-173785
Patent Literature 3: Japanese Patent Application Publication No. 2012-104731

SUMMARY OF INVENTION

Technical Problem

An object of an embodiment according to the present invention is to provide a light source device capable of irradiating a liquid crystal display module with light at uniform luminance and a display device including the light source device. Alternatively, an object of an embodiment is to provide a liquid crystal display device having a narrow frame region and high designability.

Solution to Problem

An embodiment of the present invention is a light source device. The light source device includes a rear vessel, a front cover, a light source substrate, a plurality of light-emitting diodes, and a light-diffusing plate. The front cover is located over the rear vessel and overlaps the rear vessel. The light source substrate, the plurality of light-emitting diodes, and the light-diffusing plate are accommodated between the rear vessel and the front cover. The plurality of light-emitting diodes is located over the light source substrate. The light-diffusing plate is located over the plurality of light-emitting diodes, overlaps the plurality of light-emitting diodes, and is spaced away from the plurality of light-emitting diodes. The rear vessel and the front cover each has a bottom plate and a side plate integrated with the bottom plate. In at least one of the rear vessel and the front cover, a part of the side plate is bent to form a protruding portion overlapping the bottom plate. The light-diffusing plate is located over and overlaps the protruding portion.

An embodiment of the present invention is a light source device. The light source device includes a rear vessel, a pair of spacers, a light source substrate, a plurality of light-emitting diodes over the light source substrate, and a light-diffusing plate between the pair of spacers and the plurality of light-emitting diodes. The rear vessel has a bottom plate and first to fourth side plates integrated with the bottom plate. The pair of spacers is located in the rear vessel. The light source substrate is accommodated in the rear vessel and is sandwiched by the pair of spacers. The light-diffusing plate is located over the pair of spacers and the plurality of light-emitting diodes. The pair of spacers is configured to have a height to space the light-diffusing plate away from the plurality of light-emitting diodes.

An embodiment of the present invention is a display device. The display device includes a light source device and a liquid crystal display module over the light source device. The light source device includes a rear vessel, a front cover, a light source substrate, a plurality of light-emitting diodes, and a light-diffusing plate. The front cover is located over the rear vessel and overlaps the rear vessel. The light source substrate, the plurality of light-emitting diodes, and the light-diffusing plate are accommodated between the rear vessel and the front cover. The plurality of light-emitting diodes is located over the light source substrate. The light-diffusing plate is located over the plurality of light-emitting diodes, overlaps the plurality of light-emitting diodes, and is spaced away from the plurality of light-emitting diodes. The rear vessel and the front cover each has a bottom plate and a side plate integrated with the bottom plate. In at least one of the rear vessel and the front cover, a part of the side plate is bent to form a protruding portion overlapping the bottom plate. The light-diffusing plate is located over and overlaps the protruding portion.

An embodiment of the present invention is a display device. The display device includes a light source device and a liquid crystal display module over the light source device. The light source device includes a rear vessel, a pair of spacers, a light source substrate, a plurality of light-emitting diodes over the light source substrate, and a light-diffusing plate over the pair of spacers and the plurality of light-emitting diodes. The rear vessel has a bottom plate and first to fourth side plates integrated with the bottom plate. The pair of spacers is located in the rear vessel and has a U-shaped cross section. The light source substrate is accommodated in the rear vessel and is sandwiched by the pair of spacers. The light-diffusing plate is located over the pair of spacers and the plurality of light-emitting diodes. The pair of spacers is configured to have a height to space the light-diffusing plate away from the plurality of light-emitting diodes.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, the expression "a structure is exposed from another structure" means a mode in which a part of the structure is not covered by the other structure and includes a mode where the part uncovered by the other structure is further covered by another structure.

In the specification and claims, a phrase that a plurality of elements is integrated means that, although the plurality of elements may be different in thickness, shape, direction, or the like from each other and may has different functions, they are formed from a single member. Hence, the plurality of integrated elements has the same material and the same composition as each other.

First Embodiment

In the present embodiment, a light source device 110 according to an embodiment of the present invention and a display device 100 including the display device 110 are explained.

1. Outline Structure

Figure 1:
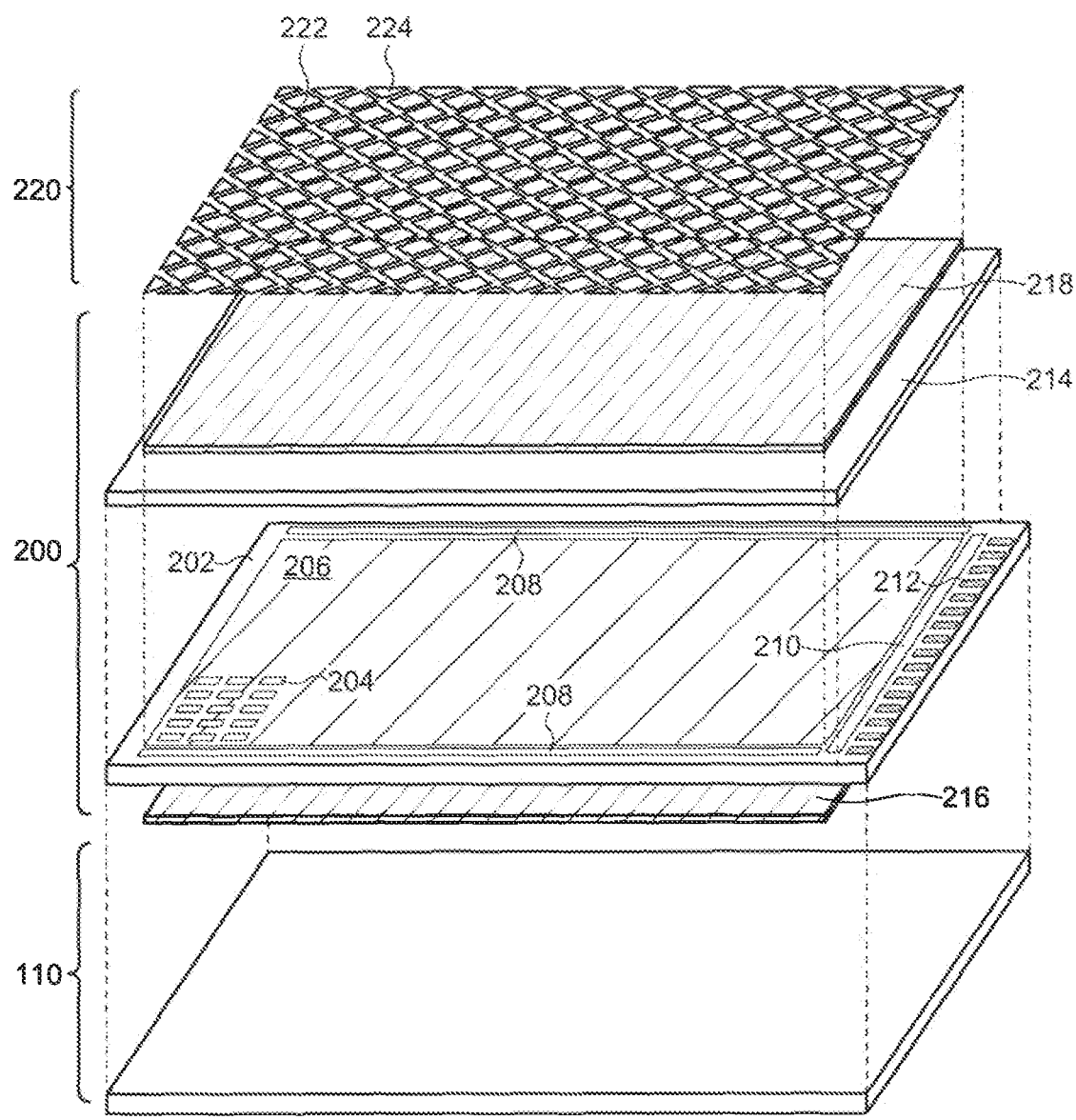
FIG. 1 is a schematic developed view of a display device according to an embodiment of the present invention.

An outline structure of the display device 100 is explained using a schematic developed view in FIG. 1. The display device 100 has, as fundamental elements, the light source device 110 and a liquid crystal display module 200 provided to overlap the light source device 110. As an optional structure, the display device 100 may have a touch sensor 220 over the liquid crystal display module 200.

The liquid crystal display module 200 has an array substrate 202, a counter substrate 214 over the array substrate 202, a pair of polarizing plates 216 and 218 sandwiching the array substrate 202 and the counter substrate 214, and a liquid crystal layer (not illustrated) sandwiched by the array substrate 202 and the counter substrate 214. A variety of patterned conductive films, insulating films, and semiconductor films is stacked over the array substrate 202, and appropriate arrangement of these films provides a plurality of pixels 204, driver circuits (scanning-line driver circuits 208 and a signal-line driver circuit 210) for driving the pixels 204, and a plurality of terminals 212, and the like. A display region 206 is formed by the plurality of pixels 204. A region other than the display region is called a frame region.

The pair of polarizing plates 216 and 218 is arranged to overlap the display region 206. A variety of signals including an image signal as well as a power source are supplied from an external circuit (not illustrated) to the liquid crystal display module 200 through the terminals 212, and the driver circuits are operated with these signals and the power source. The driver circuits control the pixels 204 to control the orientation of liquid crystal molecules included in the liquid crystal layer over the pixels 204, thereby controlling graduation of the light from the light source device 110 in every pixel.

The touch sensor 220 which is an optional element is arranged to overlap the display region 206. There is no limitation to the structure of the touch sensor 220, and an electrostatic capacitive type of touch sensor of may be used as the touch sensor 220 as shown in FIG. 1. In this case, the touch sensor 220 is structured by a plurality of first touch electrodes 222 extending in one direction (e.g., a long side direction of the display region 206), a plurality of second touch electrodes 224 intersecting the first touch electrodes 222, and an insulating film (not illustrated) electrically insulating these electrodes from one another. A capacitance formed with the first touch electrodes 222, the second touch electrodes 224, and the insulating film is varied when a user touches the touch sensor 220 with a finger or the like. It is possible to judge whether there is a touch or not and specify its position (coordinate) by detecting the variation of the capacitance, which allows a user to input a variety of instructions to the display device 100. Note that, although the light source device 110, the liquid crystal display module 200, and the touch sensor 220 are separately illustrated in FIG. 1, these items are fixed to one another using an adhesive layer or a housing.

2. Light Source Device

Figure 2:
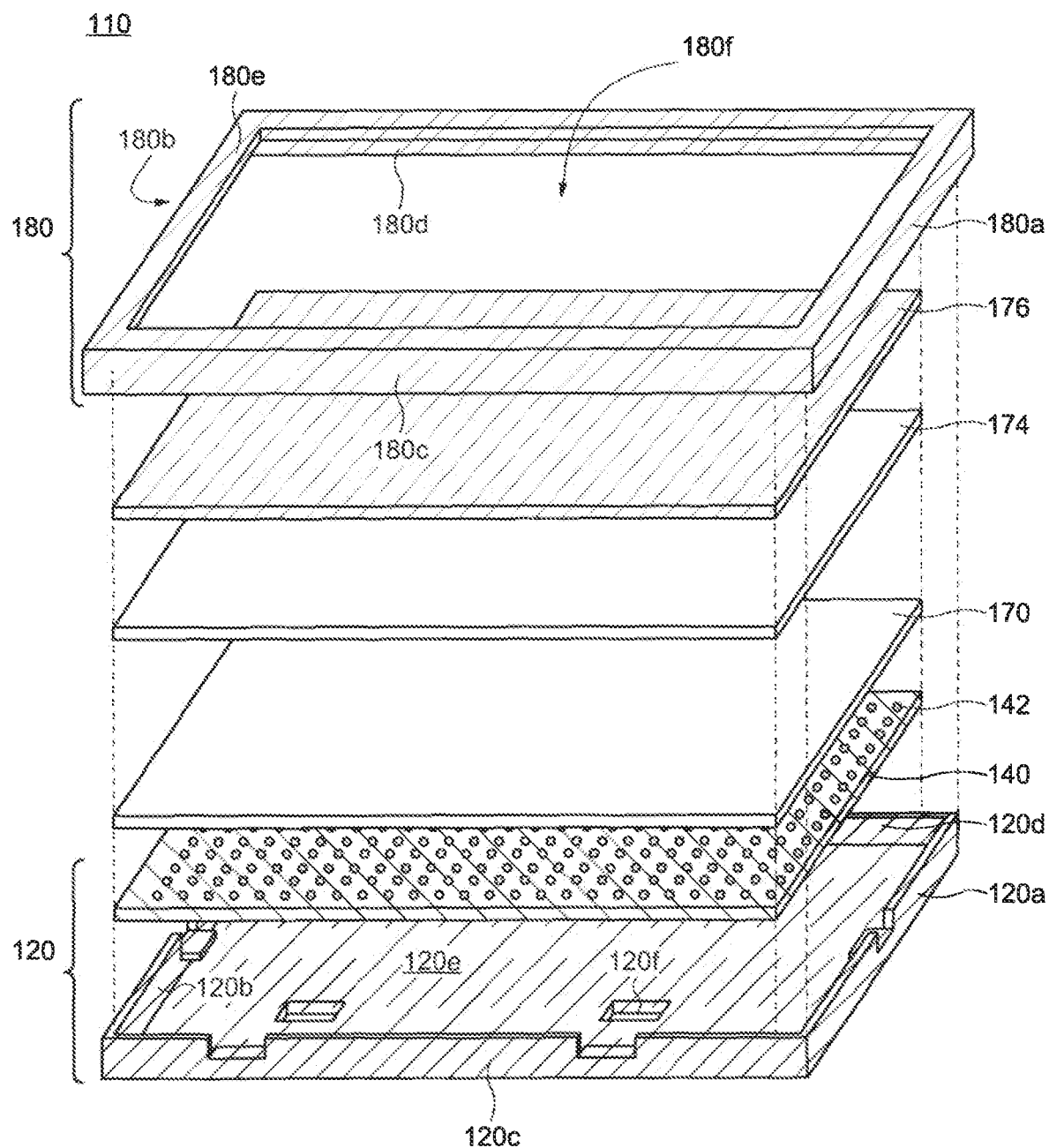
FIG. 2 is a schematic developed view of a light source device according to an embodiment of the present invention.

FIG. 2 shows a schematic developed view of the light source device 110. The light source device 110 has a rear vessel 120 and a front cover 180 configured to engage with the rear vessel 120, and a light source substrate 140, a light-diffusing plate 170 over the light source substrate 140, a prism sheet 174 over the light-diffusing plate 170, and a reflective polarizing plate 176 over the prism sheet 174 are arranged between the rear vessel 120 and the front cover 180. A plurality of light-emitting diodes 142 is arranged over the light source substrate 140.

2-1. Rear Vessel and Front Cover

The rear vessel 120 and the front cover 180 accommodate the light source substrate 140, the light-diffusing plate 170, the prism sheet 174, the reflective polarizing plate 167, and the like which structure the light source device 110. As shown in FIG. 2, the rear vessel 120 has side plates 120a to 120d and also has a bottom plate 120e located between the pair of side plates opposing each other (e.g., the pair of side plates 120a and 120b or the pair of side plates 120c and 120d). The bottom plate 120e is integrated with the side plates 120a to 120d. The side plates 120a to 120d are preferred to be arranged perpendicularly to an upper surface of the bottom plate 120e. With this structure, the light from the light-emitting diodes 142 can be efficiently utilized and supplied to the liquid crystal display module 200. The rear vessel 120 engages with the front cover 180 by which the light source substrate 140, the light-diffusing plate 170, the prism sheet 174, the reflective polarizing plate 176, and the like are fixed. One or a plurality of openings 120f is formed at the rear vessel 120, and a power source is supplied to the light-emitting diodes 142 through this opening 120f.

Similarly, the front cover 180 has side plates 180a to 180d as shown in FIG. 2. The front cover 180 further has a bottom plate 180e located between the pair of side plates opposing each other (e.g., the pair of side plates 180a and 180b or the pair of the side plates 180c and 180d). The bottom plate 180e is integrated with the side plates 180a to 180d. The side plates 180a to 180d are also preferred to be arranged perpendicularly to an upper surface of the bottom plate 180e. With this structure, not only is it possible to efficiently utilize and supply the light from the light-emitting diodes 142 to the liquid crystal display module 200 but also reduce the area of the frame region. An opening 180f is formed at the bottom plate 180e through which the light from the light-emitting diodes 142 is supplied to the liquid crystal display module 200. Note that, although the bottom plate 180e functions as a top board because the front cover 180 is arranged so that the bottom plate 180e is located on an upper side, this item is hereinafter referred to as the bottom plate 180e.

The rear vessel 120 and the front cover 180 each include a metal such as aluminum, copper, stainless steel, or the like. The rear vessel 120 may be prepared by cutting or pressing a metal plate with a thickness equal to or larger than 1 mm and equal to or smaller than 3 mm or equal to or larger than 1 mm and equal to or smaller than 2 mm, for example. A thickness of the front cover 180 may be different from the thickness of the rear vessel 120. The front cover 180 may be prepared by cutting or pressing a metal plate with a thickness equal to or larger than 0.1 mm and equal to or smaller than 1 mm or equal to or larger than 0.1 mm and equal to or smaller than 0.5 mm, for example.

It is not necessary for the bottom plates 120e and 180e of the rear vessel 120 and the front cover 180 to have a flat shape, and they may have a curved shape. In this case, the light source substrate 140, the light-diffusing plate 170, the prism sheet 174, and the like are also arranged to conform to the curved shape.

2-2. Light Source Substrate and Light-Emitting Diode

Figure 3A:
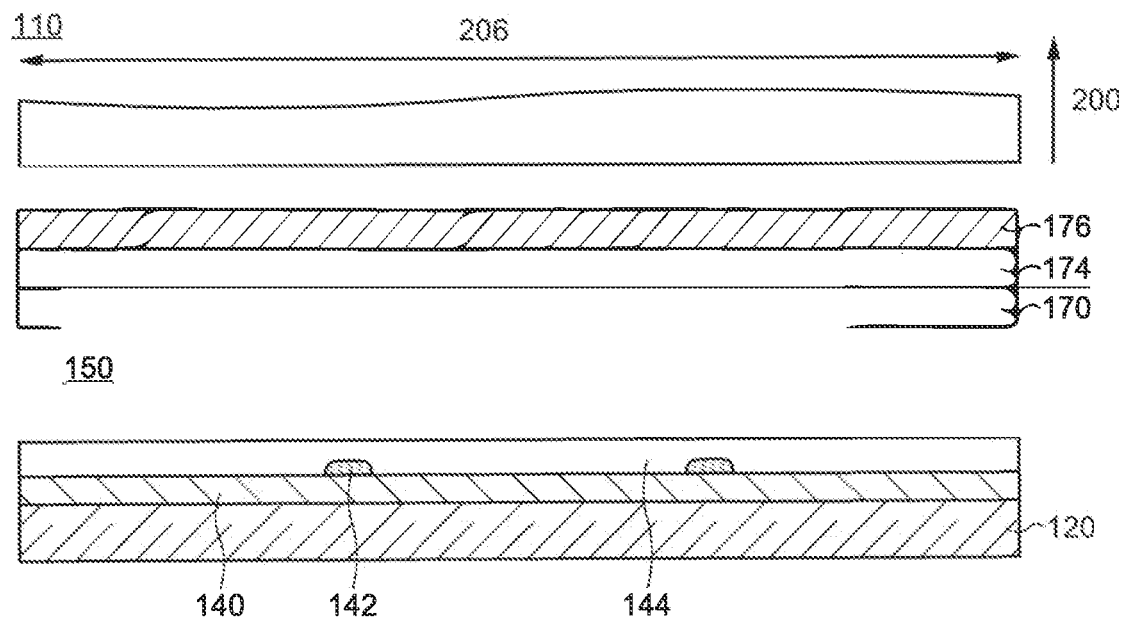
FIG. 3A and FIG. 3B are schematic cross-sectional views of a light source device according to an embodiment of the present invention.

A schematic cross-sectional view of the light source device 110 in the display region 206 is shown in FIG. 3A. As described above, the light source substrate 140 is accommodated in the rear vessel 120. The light source substrate 140 may be in contact with the rear vessel 120.

The plurality of light-emitting diodes 142 is arranged over the light source substrate 140 and overlaps the display region 206. A distance (pitch) between the adjacent light-emitting diodes 142 may be arbitrarily determined depending on the size of the display device 100. For example. the pitch may be selected from a range equal to or larger than 1 mm and equal to or smaller than 20 mm, equal to or larger than 3 mm and equal to or smaller than 15 mm, or equal to or larger than 5 mm and equal to or smaller than 10 mm. It is preferred that the plurality of light-emitting diodes 142 be arranged at a uniform pitch in order to supply the light with uniform luminance to all of the display region 206.

The light-emitting diode 142 is a light-emitting element having, as a fundamental structure, an inorganic emitter such as gallium nitride, gallium nitride containing indium, or the like and a protection film for protecting the light-emitting element and is configured to emit light by electroluminescence. As an inorganic emitter, an inorganic compound giving an emission peak between 400 nm and 530 nm may be selected, for example. In the light-emitting diode 142 with such a structure, blue emission is extracted through the protection film. Alternatively, a light-emitting diode configured to provide white light may be employed in which a color-converting material is dispersed in the protection film to allow the light from the inorganic emitter to be combined with the light obtained by converting this light from the inorganic emitter with the color-converting material.

The size of each inorganic light-emitting diode 142 is not limited, and a light-emitting diode which has an occupying area equal to or larger than $1.0 \times 10^4$ μm$^2$ and equal to or smaller than $1.0 \times 10^6$ μm$^2$, equal to or larger than $4.0 \times 10^4$ μm$^2$ and equal to or smaller than $5.0 \times 10^5$ μm$^2$, or equal to or larger than $9.0 \times 10^4$ μm$^2$ and equal to or smaller than $2.5 \times 10^5$ μm$^2$ may be used. As an example, the so-called micro-LED having a size of approximately 320 μm×300 μm may be used as the light-emitting diode 142.

The light source device 110 may further include an overcoat 144 so as to cover the light-emitting diodes 142. The overcoat 144 may be in contact with the light-source substrate 140. The overcoat 144 has a function to protect the light-emitting diodes 142 and prevent separation of the light-emitting diodes 142 from the light source substrate 140 and absorbs the depressions and projections caused by the light-emitting diodes 142 to provide a flat surface. Furthermore. the overcoat 144 is capable of spreading or diffusing the light from the light-emitting diodes 142 which generally provide light with relatively high directivity.

The overcoat 144 is preferred to have a high transmittance in a visible region and is formed to include a polymer material exemplified by an acrylic resin, a polycarbonate, a polyester such as poly(ethylene terephthalate), and the like or a silicon-containing inorganic compound such as silicon oxide. A thickness of the overcoat 144 may be arbitrarily determined, and a thickness to cover the light-emitting diodes 142 is preferred. For example, the thickness thereof may be selected from a range equal to or larger than 200 μm and equal to or smaller than 1 mm, equal to or larger than 400 μm and equal to or smaller than 1 mm, or equal to or larger than 500 μm and equal to or smaller than 800 μm.

2-3. Light-Diffusing Plate

The light-diffusing plate 170 is provided to diffuse the light from the light-emitting diodes 142 to provide a uniform emission surface. More specifically, the light-diffusing plate 170 includes a polymer material with a high transmittance with respect to visible light and diffusing particles dispersed in this polymer material. A polycarbonate, a polyester, or an acrylic resin may be used as the polymer material. The diffusing particles may be an inorganic compound such as calcium carbonate. barium sulfate, titanium dioxide. aluminum hydroxide, silicon oxide, talc, mica, white carbon, magnesium oxide, or zinc oxide or a polymer material having a poly(acrylic ester), a poly(methacrylic ester), or a polystyrene as a fundamental skeleton. A thickness of the light-diffusing plate 170 may be selected from a range equal to or larger than 0.5 mm and equal to or smaller than 2 mm or equal to or larger than 0.75 mm and equal to or smaller than 1.5 mm. The arrangement of the light-diffusing plate 170 allows the highly directive light from the light-emitting diodes 142 to be efficiently diffused, thereby decreasing the luminance distribution in the plane where the light-diffusing plate 170 is arranged. As a result. it is possible to provide the light having uniform luminance to the prism sheet 174.

Here, the light-diffusing plate 170 is spaced away from the light-emitting diodes 142 and is arranged to form a space 150 therebetween. Specifically, the light-diffusing plate 170 is arranged so that a distance (also called an optical distance) from the upper surface of the light source substrate 140 to a bottom surface of the light-diffusing plate 170 is equal to or more than 1 mm and equal to or less than 3 mm or equal to or more than 1.5 mm and equal to or less than 2.5 mm. Hence, the light-diffusing plate 170 and the light-emitting diodes 140 are not in direct contact with each other. The structure for spacing the light-diffusing plate 170 away from the light-emitting diodes 142 is described later.

Figure 3B:
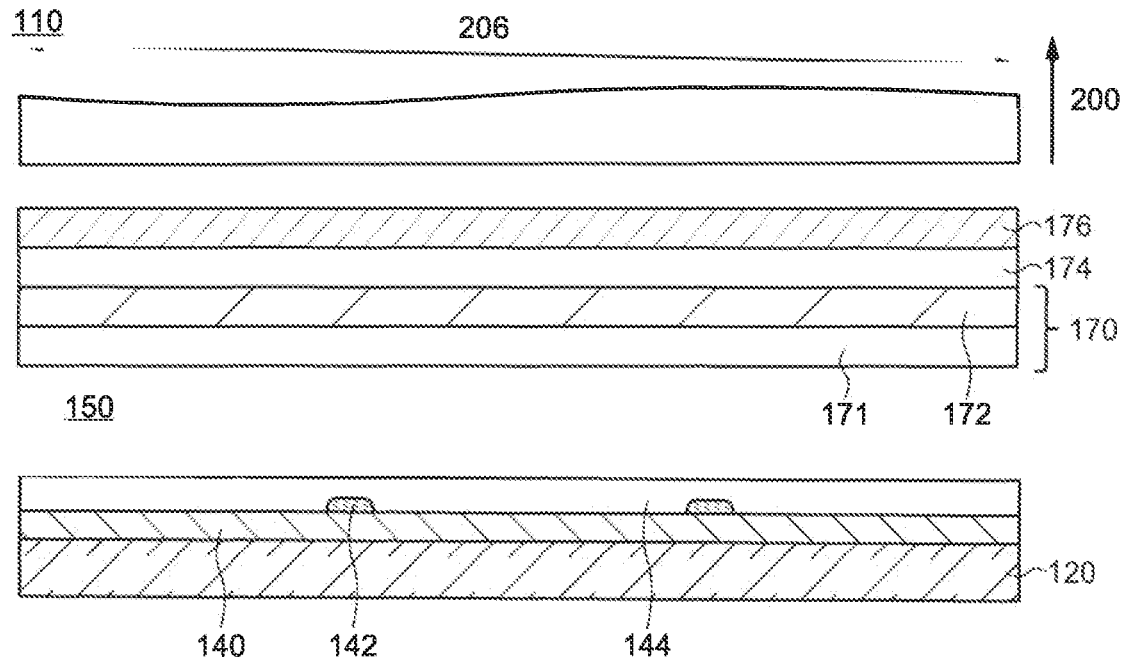

As an optional structure, the light-diffusing plate 170 may have a stacked structure including a light-diffusing layer 171 and a wavelength-converting layer 172 as shown in FIG. 3B. The light-diffusing layer 171 includes the aforementioned polymer material with a high transmittance with respect to visible light and the diffusing particles dispersed in this polymer material. On the other hand, the wavelength-converting layer 172 is a film having a function to provide white light by converting the wavelength of the light emitted from the light-emitting diodes 142 and has a structure in which a fluorescent emitter is dispersed in a polymer material. Similar to the light-diffusing layer 171, the polymer material is selected from materials with a high transmittance in a visible region, such as a polycarbonate, a polyester, and an acrylic resin. The fluorescent emitter contains a fluorescent material absorbing blue light emitted from the light-emitting diodes 142 and emitting fluorescence in a green to red region exemplified by yellow fluorescence. As the fluorescent material, an oxide containing yttrium and aluminum is exemplified. A rare earth metal such as calcium, europium, gadolinium. terbium, ruthenium, and praseodymium may be further included in this oxide. Alternatively, a quantum dot with a particle diameter of several nanometers to several-tens of nanometers may be used instead of the fluorescent emitter.

The wavelength-converting layer 172 may be stacked with the light-diffusing layer 171 as a separately prepared independent film or may be formed by applying a dispersion including the aforementioned polymer material or a precursor thereof and the fluorescent emitter or the quantum dot on the light-diffusing layer 171 followed by curing the polymer material or its precursor. There is no limitation to the vertical relationship between the light-diffusing layer 171 and the wavelength-converting layer 172. The light-diffusing layer 171 may be located between the light source substrate 140 and the wavelength-converting layer 172 as shown FIG. 3B, or the wavelength-converting layer 172 may be located between the light-diffusing layer 171 and the wavelength-converting layer 172 although this is not illustrated.

2-4. Prism Sheet

The prism sheet 174 is an optical film for upwardly radiating the light passing through the light-diffusing plate 170, that is, for radiating the light toward the side of the liquid crystal display module 200 and has a structure in which a plurality of prism shapes is arranged parallel at the surface. The prism sheet 174 may have a single-layer structure or may be structured by stacking two films provided with a plurality of prism shapes on the surfaces. In the latter case, two films may be arranged so that the directions in which the prism shapes extend intersect each other. The prism sheet 174 may also include a material with a high transmittance in the visible region, such as an acrylic resin, a polycarbonate, and a polyester.

2-5. Reflective Polarizing Plate

The reflective polarizing plate 176 has a function to transmit the polarized light included in the light passing through the prism sheet 174 and having a polarizing axis parallel to the transmitting axis of the polarizing plate 216 and to reflect the other light. This former light is extracted as linearly polarized light from the opening 180f of the front cover 180 and is supplied to the liquid crystal display module 200. On the other hand, the latter light returns to the side of the prism sheet 174, and the polarizing axis thereof changes by repeatedly reflecting and refracting between the prism sheet 174 and the light source substrate 140. When the light with the changed polarizing axis reaches the reflective polarizing plate 176 again, the polarized light having a polarizing axis parallel to the transmitting axis of the polarizing plate 216 selectively passes through the reflective polarizing plate 176. Most light from the light-emitting diodes 142 can be supplied to the liquid crystal display module 200 by repeating the aforementioned reflection and refraction, thereby reducing the power consumption of the display device 100.

3. Arrangement of the Light-Diffusing Plate and Separation from the Light-Emitting Diodes As described above, the light-diffusing plate 170 is arranged so as to be spaced away from the light-emitting diodes 142 to form the space 150 therebetween in the light source device 100. In the present embodiment, a structure for realizing this arrangement is established in at least one of the rear vessel 120 and the front cover 180. A schematic perspective view of the rear vessel 120, the light source substrate 140, and the light-diffusing plate 170 of the light source device 100 according to the present invention is illustrated in FIG. 4A, a schematic top view of a state in which the light source substrate 140 and the light-emitting diodes 142 thereover are arranged in the rear vessel 120 is shown in FIG. 4B, and an enlarged view of a part of FIG. 4A is shown in FIG. 5A.

Figure 4A:
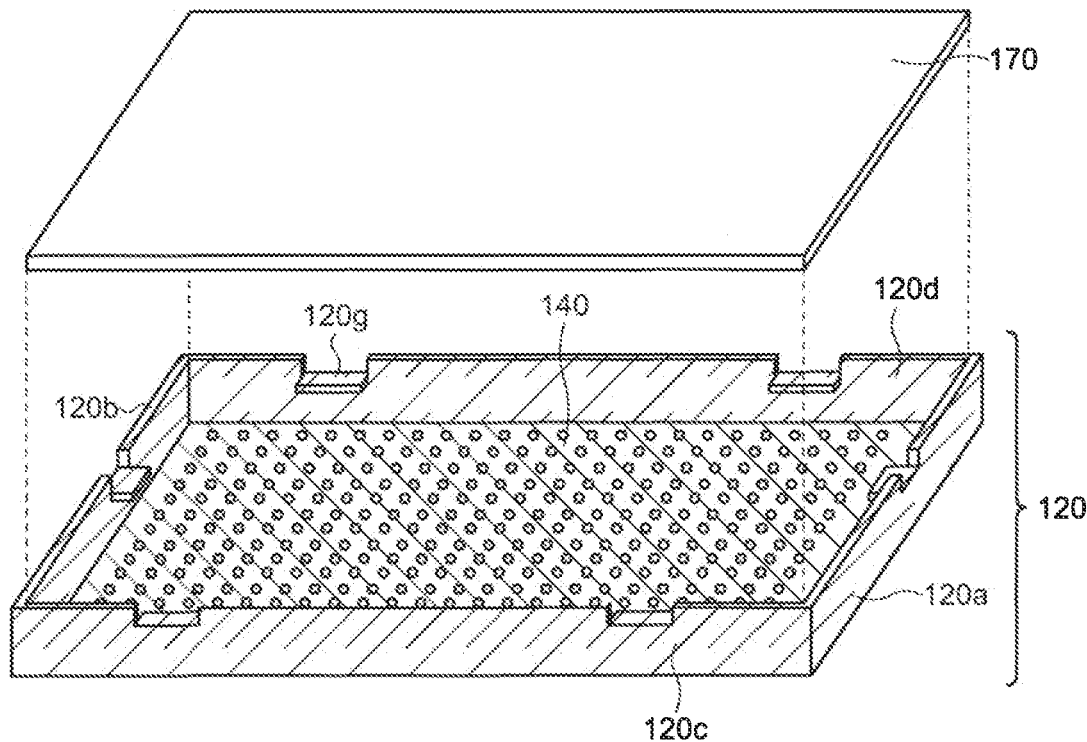
FIG. 4A and FIG. 4B are respectively schematic perspective and top views of a light source device according to an embodiment of the present invention.
Figure 4B:
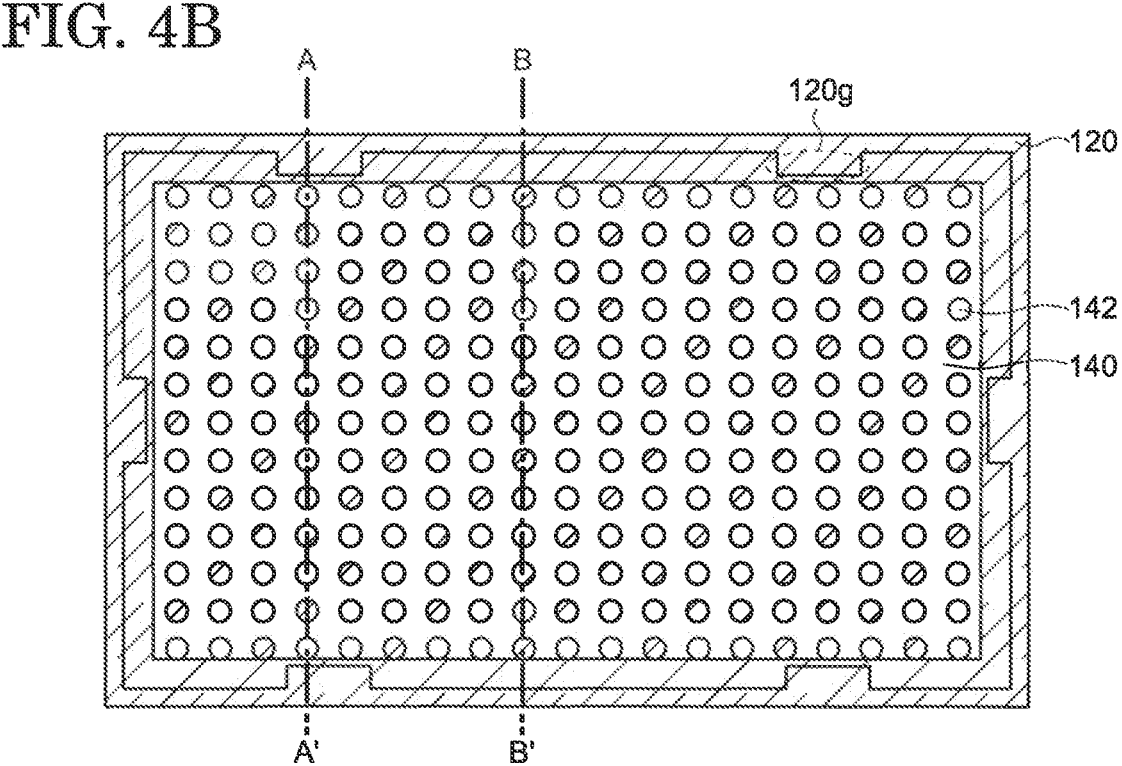
Figure 5A:
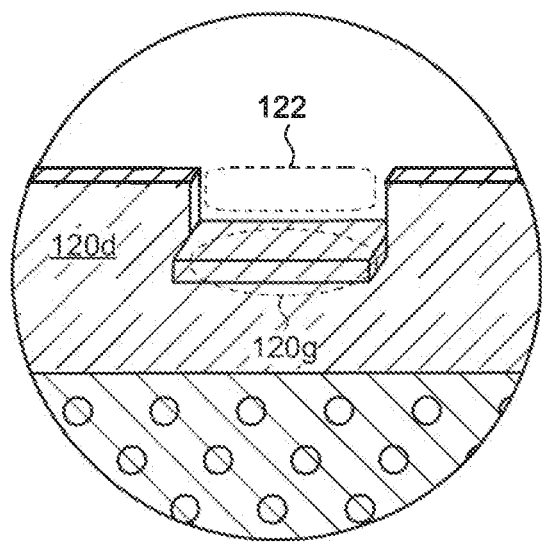
FIG. 5A is a schematic perspective view of a light source device according to an embodiment of the present invention.

As shown in FIG. 4A, at least one protruding portion 120g is provided to at least each of one pair of the side plates 120a to 120d of the rear vessel 120. More specifically, a part of the side plate (here, the side plate 120d) is bent, which allows the side plate to have the protruding portion 120g extending toward the opposing side plate (here, the side plate 120c illustrated in FIG. 4A) as shown in FIG. 5. The protruding portion 120g overlaps the bottom plate 120e. The protruding portion 120g extends toward the opposing side plate so as to be parallel to the upper surface of the bottom plate 120e or incline from the upper surface of the bottom plate 120e by an angle equal to or less than ±3°, equal to or less than ±20°, or equal to or less than ±10°.

Figure 5B:
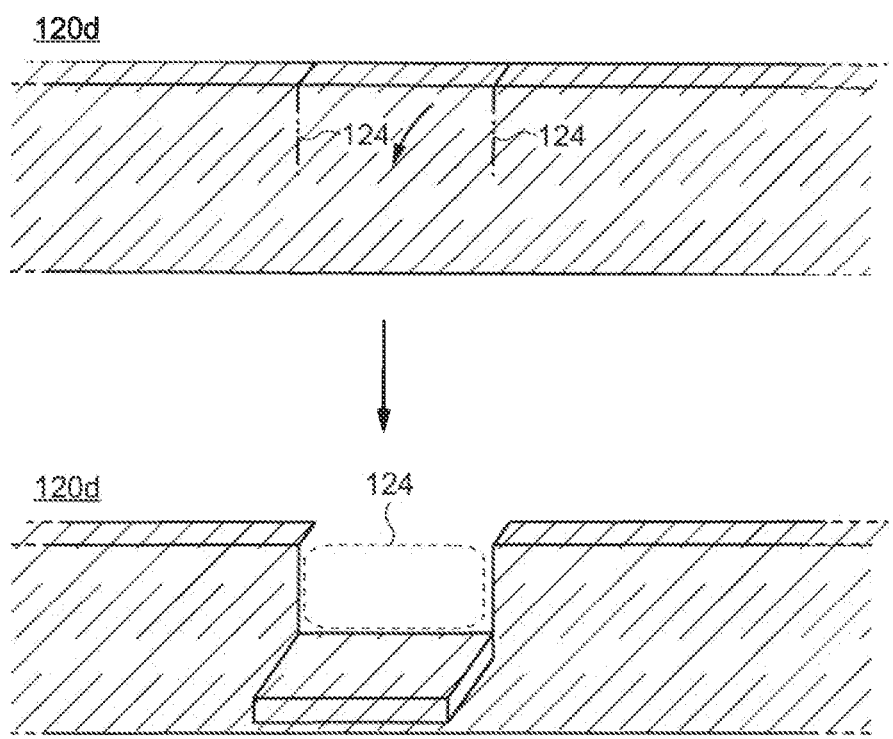
FIG. 5B is a schematic perspective view showing a method for forming a protruding portion.

The protruding portion 120g can be formed by forming a pair of slits 124 in the side plate from an opposite side with respect to the bottom plate 120e and bending a portion between the pair of slits 124 toward the opposing side plate, that is, toward an inner side of the rear vessel 120 (FIG. 5B). Thus, the protruding portion 120g is integrated with the side plate, includes the same material as the side plate, and has the same composition as the side plate. The bending may be performed before or after arranging the light source substrate 140 in the rear vessel 120.

Due to aforementioned forming method, a cutoff 122 is formed to between the pair of slits 124. In other words, the side plate continues to the protruding portion 120g, has a pair of flat portions sandwiching the protruding portion 120g, and has the cutoff 122 between the pair of flat portions. The cutoff 122 is located over the protruding portion 120g. Moreover, an area of an upper surface of the protruding portion 120g is substantially the same as an area of the cutoff 122, and the lengths of the cutoff 122 and the protruding portion 120g are the same as each other in a direction in which the side plate extends. Furthermore, a length of the protruding portion 120g in a direction toward the opposing side plate is substantially the same as a height of the cutoff 122. In addition, a thickness of the protruding portion 120g (a length in a normal direction of the bottom plate 120e) is the same as a width of the side plate (a length in a direction perpendicular to a direction in which the side plate extends and parallel to the upper surface of the bottom plate 120e).

The arrangement of the protruding portion 120g may be arbitrarily determined, and at least one or more protruding portions 120g may be arranged in each of two side plates opposing each other. For example, two protruding portions 120g may be arranged in each of the side plates opposing each other, or one and two protruding portions 120g are respectively arranged in one side plate and the opposing side plate. Alternatively, one or plural protruding portions 120g may be formed at all of the side plates.

Figure 6A:
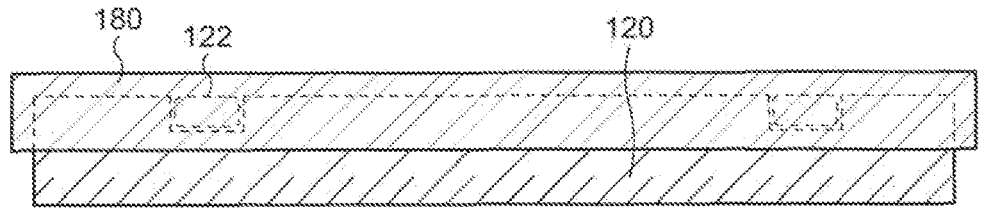
FIG. 6A and FIG. 6B are schematic side views and FIG. 6C and FIG. 6D are schematic cross-sectional views of a light source device according to an embodiment of the present invention.
Figure 6B:
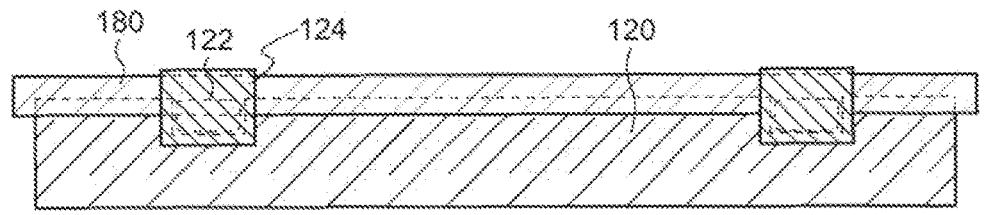

The front cover 180 covers the rear vessel 120 to accommodate the rear vessel 120 (see FIG. 2). A schematic side view of a state where the rear vessel 120 is accommodated in the front cover 180 is shown in FIG. 6A. The front cover 180 may be configured to cover all of the cutoffs 122 (FIG. 6A) or may be configured to cover a part of the cutoff 122 and expose the other part (FIG. 6B). In the latter case, a light-shielding film 126 may be disposed to cover the cutoff 122 in order to prevent the light emitted from the light-emitting diodes 142 from leaking outside (FIG. 6B).

As demonstrated in FIG. 4A, FIG. 4B, and schematic views (FIG. 6C and FIG. 6D) of cross sections along chain lines A-A' and B-B', the light source substrate 140 and the light-emitting diodes 142 provided thereover are arranged between the protruding portions 120g and the bottom plate 120e. The light-diffusing plate 170, the prism sheet 174, and the reflective polarizing plate 176 are arranged over the protruding portions 120g to be sandwiched between and fixed by the protruding portions 120g and the front cover 180. The protruding portion 120g is formed by adjusting the length of the slit 124 and the height of the side plate so that a value obtained by subtracting the thickness of the light source substrate 140 from the height $h_1$ of the protruding portion 120g (i.e., a distance between the upper surface of the protruding portion 120g and the upper surface of the bottom plate 120e) is equal to or more than 1 mm and equal to or less than 3 mm or equal to or more than 1.5 mm and equal to or less than 2.5 mm.

Figure 6C:
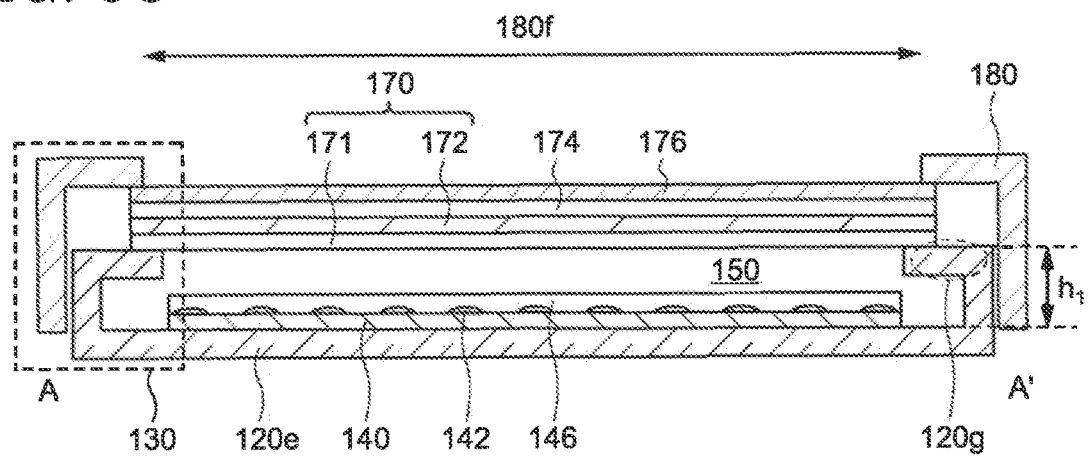
Figure 6D:
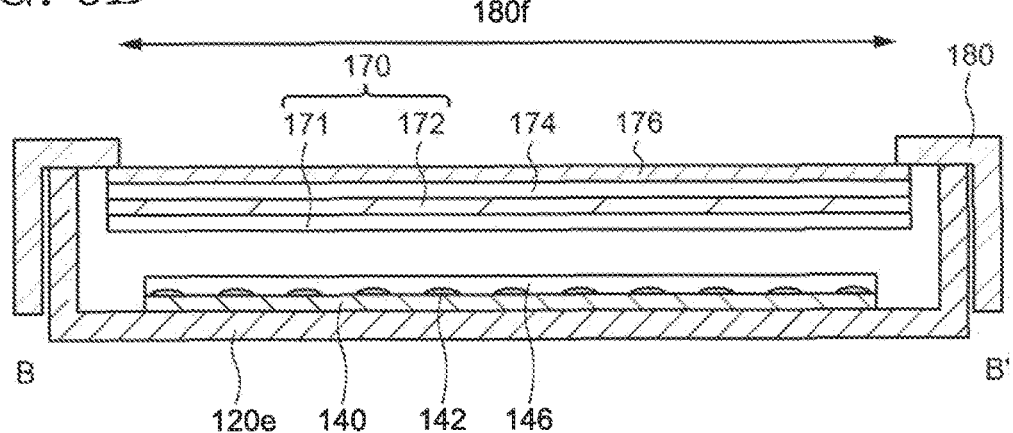
Figure 7A:
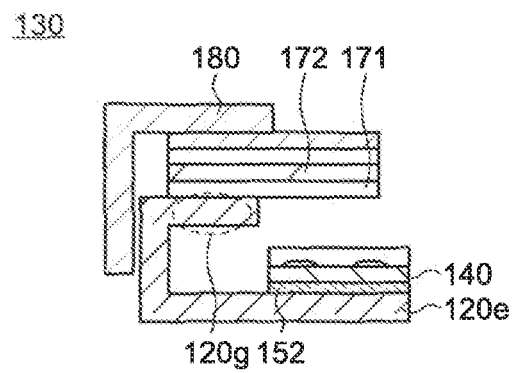
FIG. 7A to FIG. 7E are schematic cross-sectional views of a light source device according to an embodiment of the present invention.
Figure 7B:
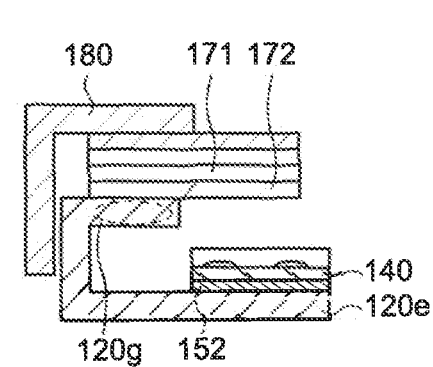
Figure 7C:
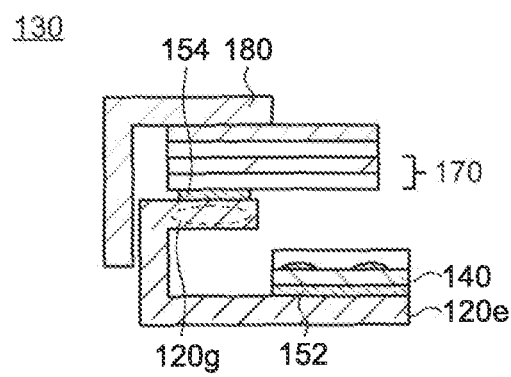
Figure 7D:
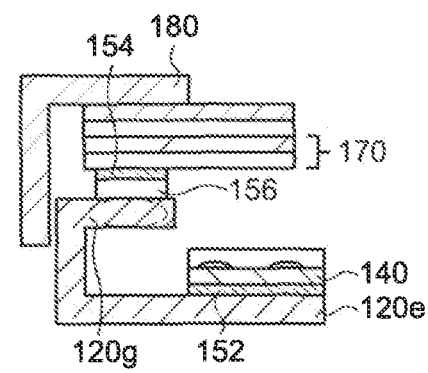
Figure 7E:
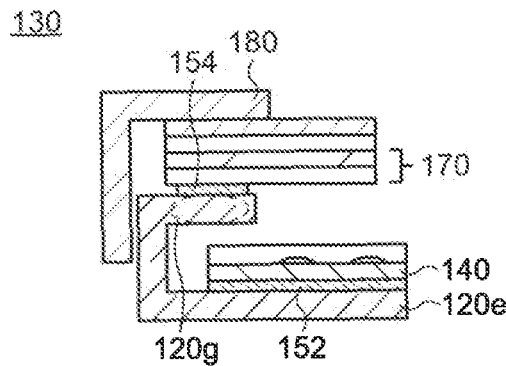

An enlarged view of a region 130 in FIG. 6C is shown in FIG. 7A to FIG. 7E. As shown in FIG. 7A, the light source substrate 140 is fixed to the bottom plate 120e with an adhesive layer (e.g., an adhesive, double-sided tape, or the like) 152. The protruding portion 120g is preferred not to overlap the light-emitting diode 142. With this structure, the light from the light-emitting diodes 142 can be efficiently utilized. The light-diffusing plate 170 may be in direct contact with the protruding portion 120g (FIG. 7A) or may be fixed to the protruding portion 120g through the adhesive layer 154 as shown in FIG. 7C. When the stack of the wavelength-converting layer 172 and the light-diffusing layer 171 is provided as the light-diffusing plate 170, the wavelength-converting plate 170 may be disposed so that the wavelength-converting layer 172 is in contact with the protruding portion 120g as shown in FIG. 7B, or the wavelength-converting layer 172 may be fixed to the protruding portion 120g with an adhesive layer over which the light-diffusing layer 171 is arranged. Alternatively, a buffer material 156 may be disposed over the protruding portion 120g as shown in FIG. 7D. Although not illustrated, the light source device 110 may be configured so that the buffer material 156 is in contact with the light-diffusing layer 171 or the wavelength-converting layer 172. The buffer material 156 is preferred to include an elastomer exhibiting rubber elasticity, and a polysiloxane, a polyacrylate, a polymethacrylate, polyacrylonitrile, an epoxy resin, polybutadiene, polyisoprene, or a copolymer containing any of these polymers as a basic skeleton are exemplified as such a material. It is possible to prevent damage of the light-diffusing plate 170 by disposing the buffer material 156. Alternatively, the light source substrate 140 may be arranged so that a part of the light source substrate 140 overlaps with the protruding portion 120g. In this case, the light source substrate 140 may be arranged in the rear vessel 120 provided with the slits 124, and then the protruding portion 120g may be formed by bending a part of the side plate between the pair of slits 124.

As described above, the light source substrate 140 over which the plurality of light-emitting diodes 142 is arranged, the light-diffusing plate 170, the prism sheet 174, and the reflective polarizing plate 176 are accommodated between the rear vessel 120 and the front cover 180 and fixed with one another in the light source device 110. The display device 100 is structured by arranging the liquid crystal display module 200 over this light source device 110. Here, the protruding portion 120g overlapping and located over the bottom plate 120e is formed at the side plate of the rear vessel 120, and the light source substrate 140 is arranged between the bottom plate 120e and the protruding portion 120g whereas the light-diffusing plate 170 is arranged over the protruding portion 120g in the light source device 110. Therefore, a sufficient gap (the space 150) is provided between the light source substrate 140 and the light-diffusing plate 170. Hence, even if highly directive light is radiated from the light-emitting diodes 142, the light spreads in the space 150 between the light source substrate 140 and the light-diffusing plate 170. In addition, the directivity of the light is further reduced by repeatedly being reflected in this space 150. Accordingly, localized generation of a region with high luminance (hot spot) is prevented at the bottom surface of the light-diffusing plate 170. When the light decreased in intensity distribution by the space 150 between the light source substrate 140 and the light-diffusing plate 170 passes through the light-diffusing plate 170, the light is further scattered by the diffusing particles. Moreover, when the light-diffusing plate 170 has the wavelength-converting layer 172, the fluorescent emitter included in the wavelength-converting layer 172 is also able to contribute to the light diffusion. With this mechanism, the light with uniform luminance can be supplied to the wavelength-converting layer 172 and the prism sheet 174. Hence, the light with uniform luminance is provided to the display region 206, which allows the display device 100 to provide high quality display.

Furthermore, the light-emitting diodes 142 functioning as a light source can be arranged under the display region 206, that is, under the light-diffusing plate 170 in the display device 100 of the present embodiment. Thus, compared with the structure in which a light source is arranged in a frame region, it is not necessary to arrange a reflective plate for reflecting the light toward the side of the liquid crystal display module 200, thereby reducing the number of components structuring a light source device. This feature contributes to thinning of a display device. Moreover, since no light source is required to be arranged in the frame region, it is possible to reduce the frame region and increase the area of the display region 206 with respect to the whole of the display device 100. Hence, implementation of the present embodiment enables production of a display device with an excellent design.

Second Embodiment

In the preset embodiment, a modified example of the rear vessel 120 is explained. An explanation of the structures the same as or similar to those described in the First Embodiment may be omitted.

Figure 8A:
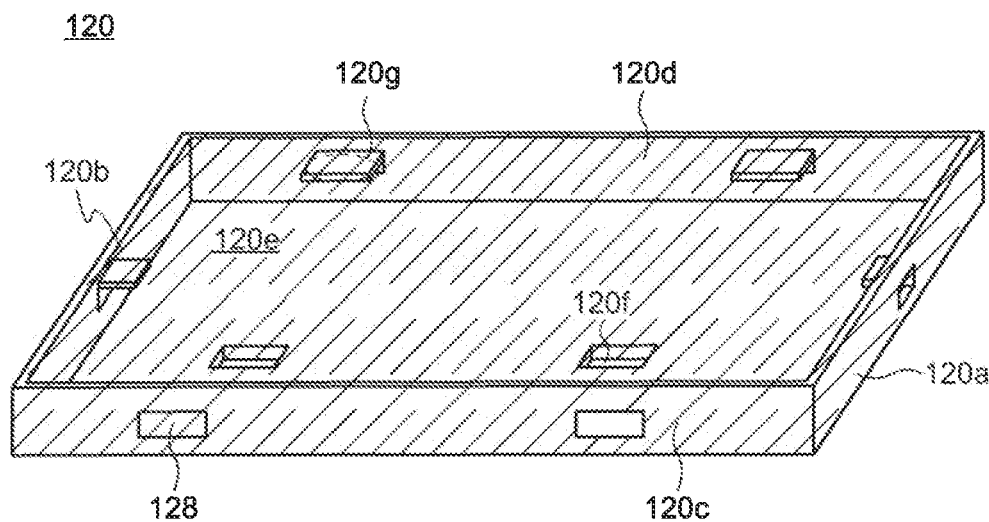
FIG. 8A and FIG. 8B are respectively schematic perspective and top views of a light source device according to an embodiment of the present invention.
Figure 8B:
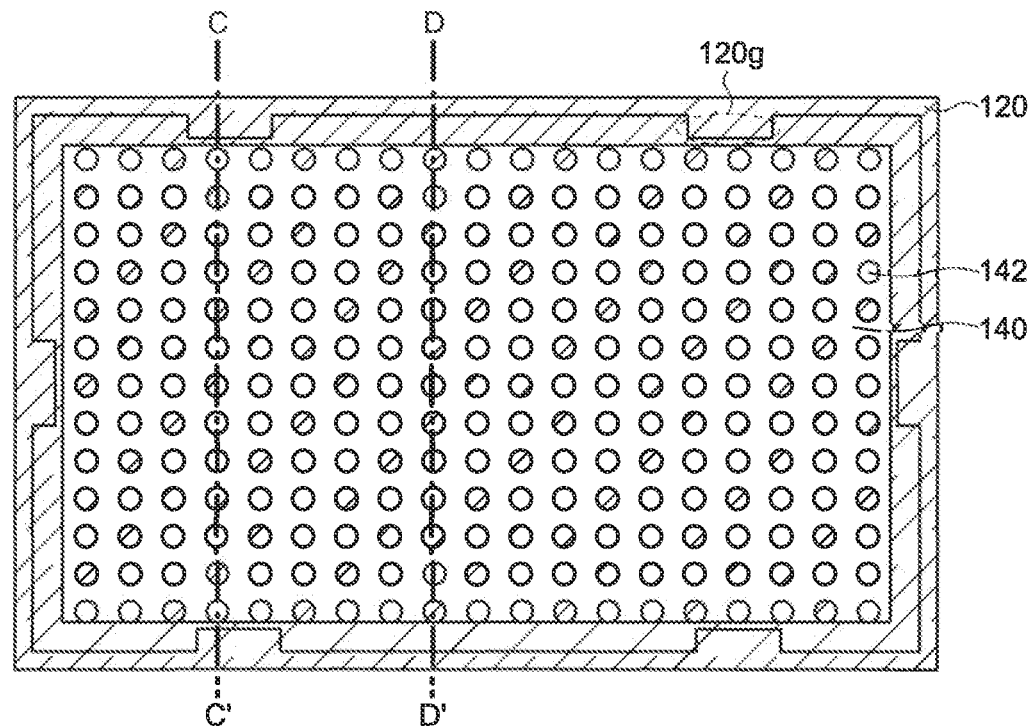
Figure 9A:
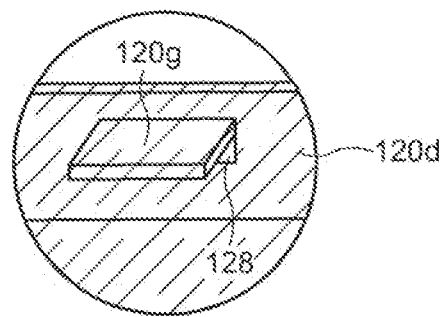
FIG. 9A and FIG. 9B are schematic perspective views and FIG. 9C and FIG. 9D are schematic side views of a light source device according to an embodiment of the present invention.

A schematic perspective view of the rear vessel 120 of the light source device 110 according to the present embodiment is shown in FIG. 8A, a schematic top view of a state in which the light source substrate 140 and the light-emitting diodes 142 are arranged in the rear vessel 120 is illustrated in FIG. 8B, and a schematic side view of the rear vessel 120 is shown in FIG. 9A. As can be understood from FIG. 8A and FIG. 9A, at least one of the side plates 120a to 120d of the rear vessel 120 is partly bent, which allows the side plate to have an opening 128 as well as the protruding portion 120g extending to the opposing side plate. The protruding portion 120g can be fabricated by forming a U-shaped slit 124 and bending a part of the side plate about the opening portion of the U-shape as an axis. Hence, the protruding portion 120g continues from the side plate and is integrated with the side plate, includes the same material as the side plate, and has the same composition as the side plate.

Figure 9B:
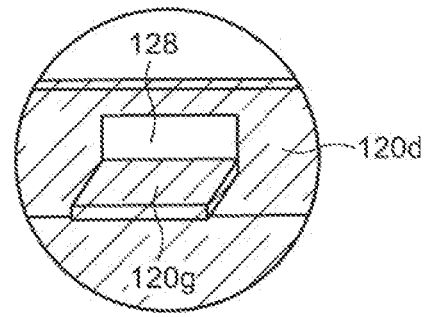

Extended views centering on the protruding portion 120g are shown in FIG. 9A and FIG. 9B. The protruding portion 120g may be located over the opening 128 as a visor of the opening 128 as shown in FIG. 9B or may be formed to be located under the opening 128 as a tongue with respect to the opening 128. The aforementioned U-shaped slit 124 may be formed so that the opening portion faces upward (the opposing side to the bottom plate 120e), in the example demonstrated in FIG. 9A, while the U-shaped slit 124 is formed so that the opening portion faces downward (the side of the bottom plate 120e) in the example shown in FIG. 9B. After that, a portion of the side plate is bent so that the portion surrounded by the slit 124 faces the inside of the rear vessel 120 to form the protruding portion 120g.

Figure 9C:
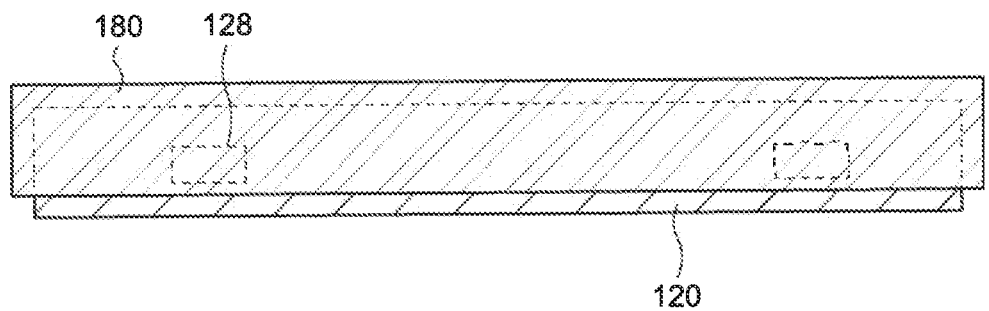
Figure 9D:
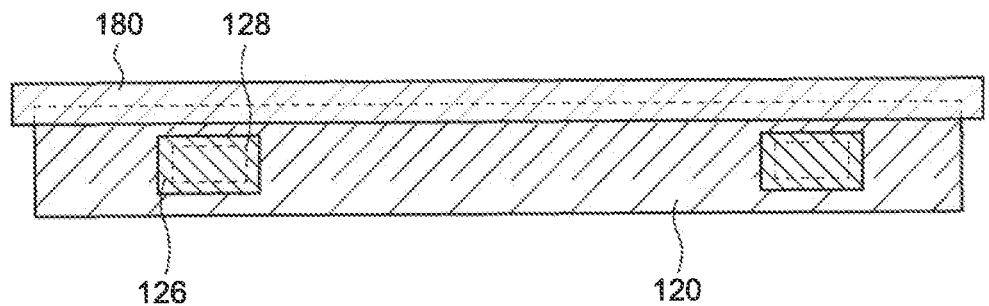

Similar to the structure described in the First Embodiment, the front cover 180 may be configured to cover the whole of the opening 128 (FIG. 9C) or may be configured to expose at least a part of the opening 128 (FIG. 9D). In the latter case, the opening 128 is covered by the light-shielding film 126, by which the light from the light-emitting elements 142 is prevented from leaking outside.

Figure 10A:
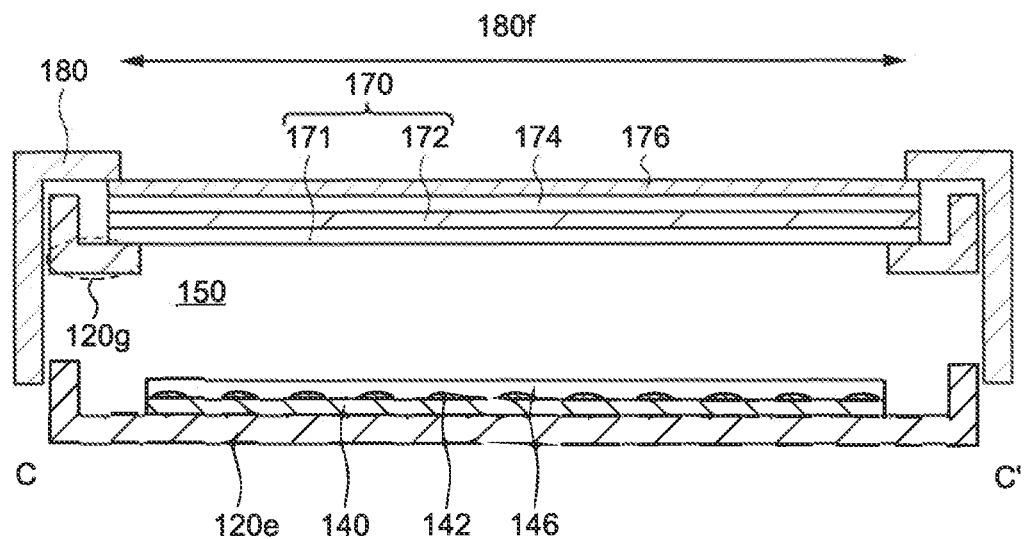
FIG. 10A and FIG. 10B are schematic cross-sectional views of a light source device according to an embodiment of the present invention.
Figure 10B:
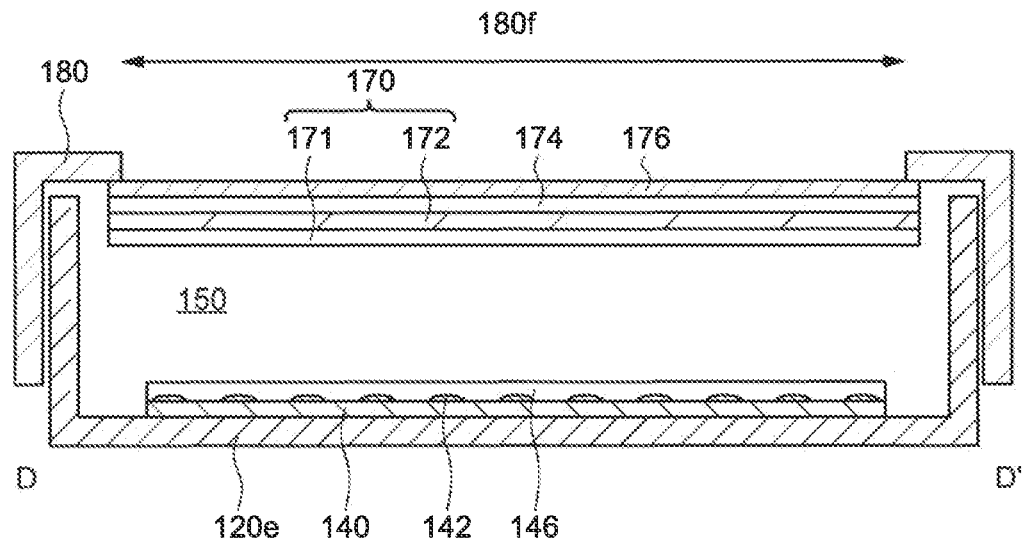

Schematic views of cross sections along chain lines C-C' and D-D' in FIG. 8B are respectively illustrated in FIG. 10A and FIG. 10B. Similar to the First Embodiment, the light source substrate 140 is arranged in the rear vessel 120. The light source substrate 140 is fixed to the bottom plate 120e of the rear vessel 120 with the adhesive layer 152 (not illustrated) or the like. The light-diffusing plate 170, the prism sheet 174, the reflective polarizing plate 176, and the like are sandwiched between and fixed by the upper surface of the protruding portion 120g and the front cover 180. Hence, a sufficient gap is provided between the light source substrate 140 and the light-diffusing plate 170. As a result, the highly directive light from the light-emitting diodes 142 is efficiently diffused by the space 150 between the light source substrate 140 and the light-diffusing plate 170 and by the light-diffusing function of the light-diffusing plate 170, by which the effects described in the First Example can be realized.

Third Embodiment

In the present embodiment, another modified example of the rear vessel 120 is explained. An explanation of the structures the same as or similar to those described in the First and Second Embodiments may be omitted.

Figure 11A:
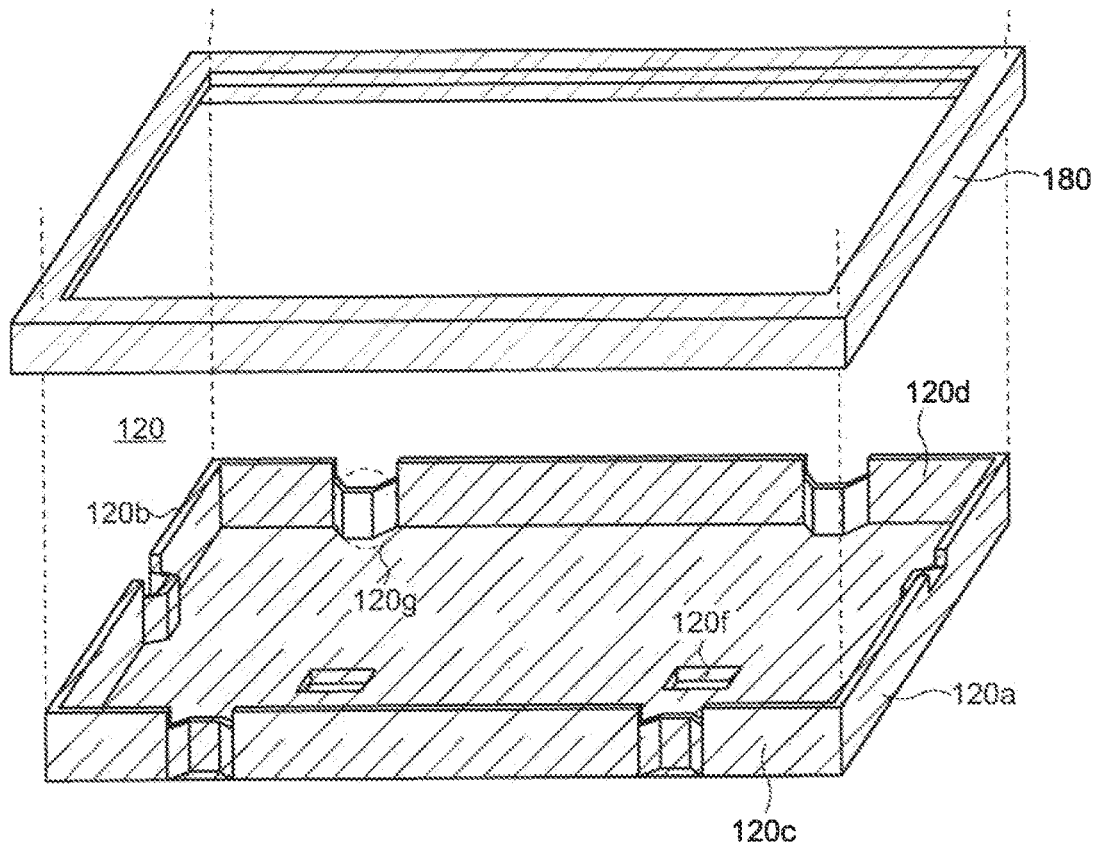
FIG. 11A and FIG. 11B are respectively schematic perspective and top views of a light source device according to an embodiment of the present invention.
Figure 11B:
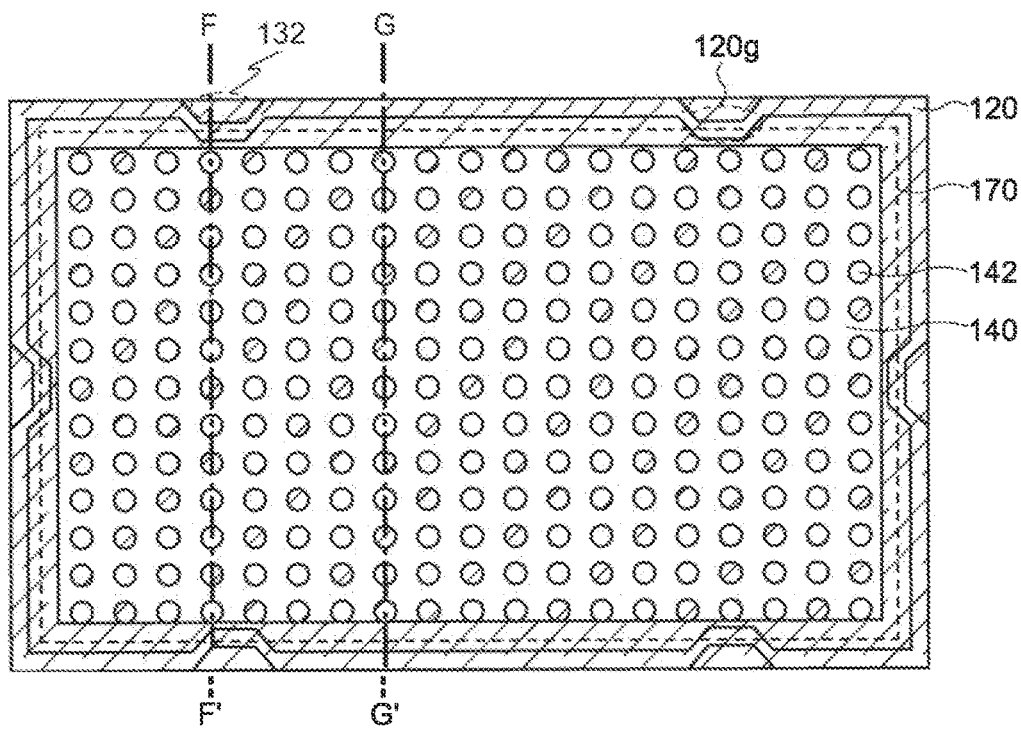
Figure 12A:
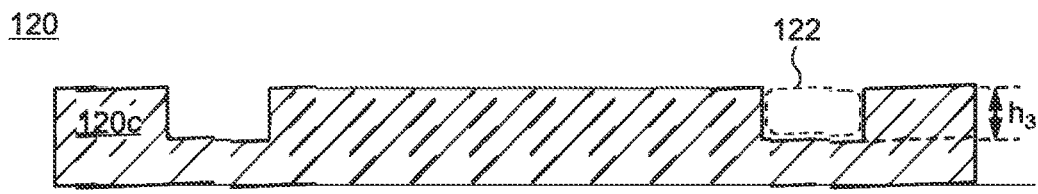
FIG. 12A and FIG. 12B are schematic side views and FIG. 12C and FIG. 12D are schematic cross-sectional views of a light source device according to an embodiment of the present invention.
Figure 12B:
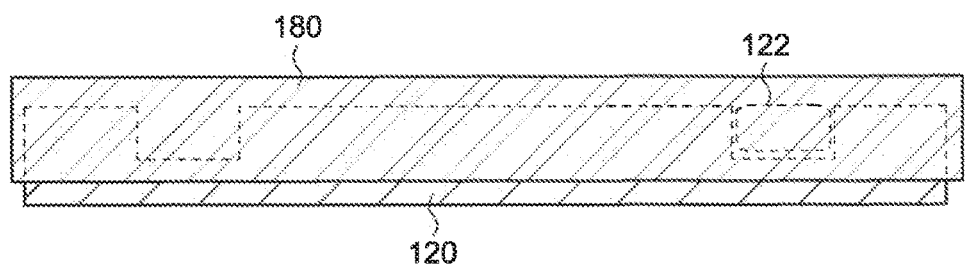

A schematic perspective view of the rear vessel 120 and the front cover 180 is shown in FIG. 11A, and a schematic top view of a state where the light source substrate 140 and the light-emitting diodes 142 are accommodated in the rear vessel 120 is illustrated in FIG. 11B. FIG. 12A is a schematic side view of the rear vessel 120, and FIG. 12B is a schematic side view of a state in which the front cover 180 is further arranged. Schematic views of cross sections along chain lines F-F' and G-G' in FIG. 11B are respectively shown in FIG. 12C and FIG. 12D.

Figure 12C:
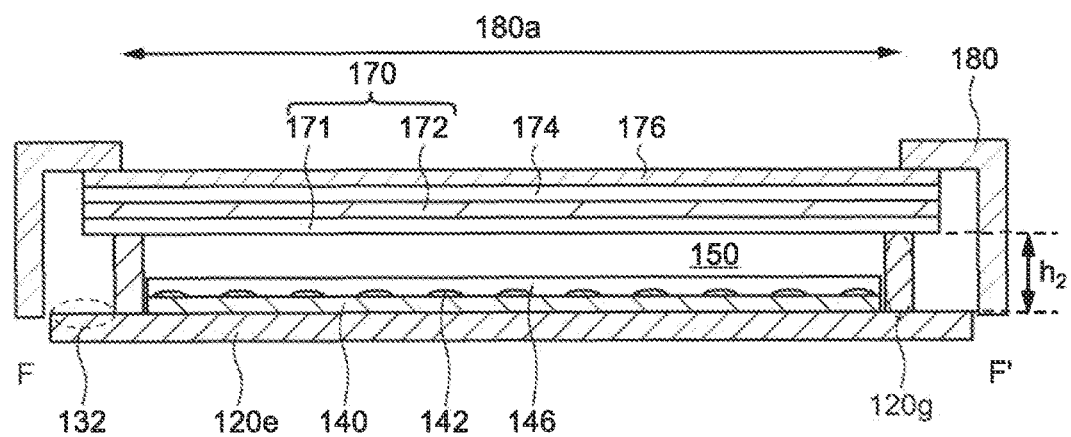

As can be understood from FIG. 11A and FIG. 12A, at least one cutoff 122 is provided to each of at least one pair of the side plates of the rear vessel 120 in the light-source device 110 of the present embodiment. In the side plate provided with the cutoff 122, a part of the side plate, more specifically, a portion located directly under the cutoff 122, recesses in the outside of the rear vessel 120 to form the protruding portion 120g protruding toward the inside of the rear vessel 120 (FIG. 11A and FIG. 11B). In addition, the bottom plate 120e is exposed from the protruding portion 120g in the outside of the rear vessel 120 (see a region 132 in FIG. 11B and FIG. 12C). This exposed region 132 overlaps the front cover 180 (FIG. 12C). Although the protruding portion 120g may be in contact with the bottom plate 120e, the protruding portion 120g does not directly continue from the bottom plate 120e and is integrated with the bottom plate 120e through the side plate provided with this protruding portion.

One cutoff 122 and one protruding portion 120g may be arranged in each of at least two opposing side plates. For example, two cutoffs 122 and two protruding portions 120g may be formed at each of two opposing side plates. One cutoff 122 and one protruding portion may be formed at one side plate whereas two cutoffs 122 and two protruding portions 120g may be formed at the opposing side plate. Alternatively, one or plural cutoffs 122 and protruding portions 120g may be formed at all of the side plates.

As shown in FIG. 11B, the light source substrate 140 is accommodated in the rear vessel 120 so as to be sandwiched by the protruding portions 120g provided to the opposing side plates. Hence, the arrangement position of the light source substrate 140 can be determined by the protruding portions 120g in the rear vessel 120. The light-diffusing plate 170 and the like are arranged over the protruding portions 120g to overlap the protruding portions 120g. As shown in FIG. 11A and FIG. 12C, the protruding portions each have a flat upper surface parallel to the upper surface of the bottom plate 120e of the rear vessel 120. It is possible to stably hold not only these items but also the prism sheet 174 and the reflective polarizing plate 176 and also to secure the space 150 between the light-diffusing plate 170 and the light source substrate 140 by arranging the light-diffusing plate 170 and the like over these flat upper surfaces. Similar to the First Embodiment, the buffer material 156 may be disposed over the protruding portion 120g (see FIG. 7D).

Figure 12D:
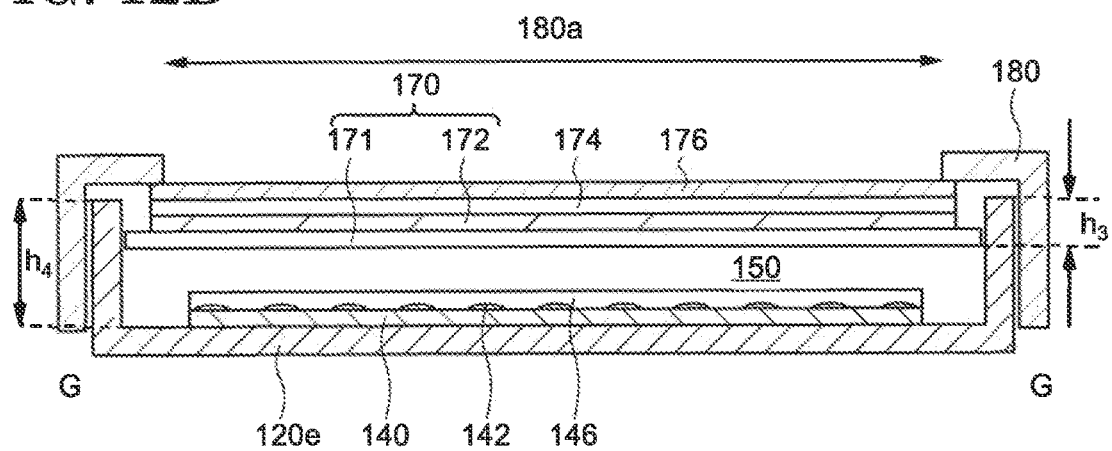

As can be understood from FIG. 12A, FIG. 12C, and FIG. 12D, the distance between the light source substrate 140 and the light-diffusing plate 170 is determined by a height $h_2$, where a height of the protruding portion 120g (a length from the upper surface of the bottom plate 120e to the upper surface of the protruding portion 120g in the normal direction of the bottom plate 120e) is defined as the height $h_2$. The height $h_2$ is a value obtained by subtracting a height $h_3$ from a height ha of the side plate (a length from the upper surface of the bottom plate 120 to an upper surface of a portion of the side plate where no cutoff 122 is provided), where a height of the cutoff 122 (a length of the cutoff 122 in the normal direction of the bottom plate 120e) is defined as the height $h_3$. Therefore, the height $h_3$ of the cutoff 122 is adjusted on the basis of the height ha of the side plate so that a value obtained by subtracting the thickness of the light-source substrate 140 from the height $h_2$ is equal to or more than 1 mm and equal to or less than 3 mm or equal to or more than 1.5 mm and equal to or less than 2.5 mm.

Similar to the light source devices 110 of the First and Second Embodiments, the front cover 180 may be configured to cover the whole of the cutoff 122 (FIG. 12B) or to expose all of or a part of the cutoff 122 although this is not illustrated. In the latter case, the cutoff 122 is covered by the light-shielding film 126 (see FIG. 6B).

Figure 13A:
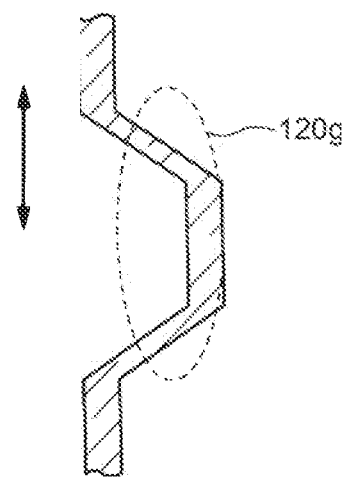
FIG. 13A to FIG. 13D are schematic top views of a side plate centering on a protruding portion of a light source device according to an embodiment of the present invention.
Figure 13B:
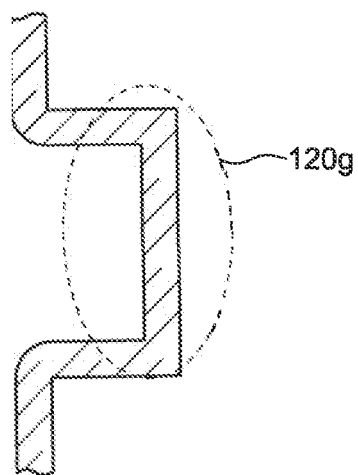
Figure 13C:
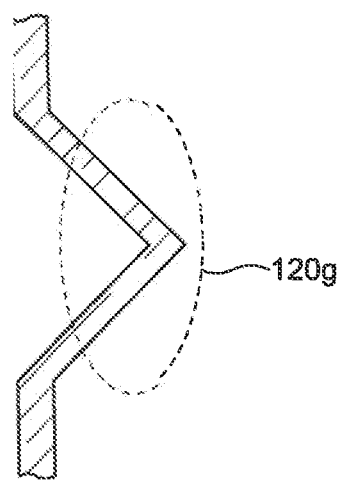
Figure 13D:
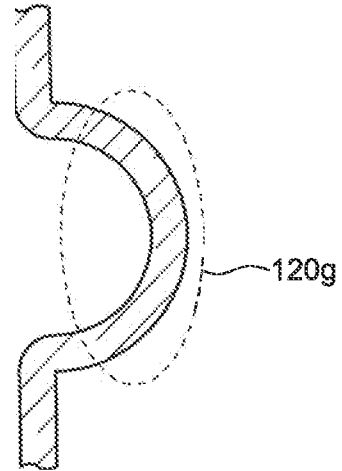

Enlarged schematic views of the upper surface of the side plate including the protruding portion 120g are shown in FIG. 13A to FIG. 13D. The shape of the protruding portion 120g is not limited, and the protruding portion 120g may include a linear portion and a plurality of bending portions in a plane parallel to the upper surface of the bottom plate 120e (FIG. 13A and FIG. 13B). In this case, the linear portion may be parallel to the direction in which the side plate extends (the direction indicated by an arrow in FIG. 13A) or may be inclined from this direction. The protruding portion 120g may be composed of a plurality of linear portions and a single bending portion in this plane (FIG. 13C). Alternatively, a curved portion may be included in this plane (FIG. 13D).

In the present embodiment, the space 150 is also formed between the light source substrate 140 and the light-diffusing plate 170 by the protruding portions 120g, by which the light from the light-emitting diodes 142 can be spread. This effect is combined with the contribution of the light-diffusing plate 170 to the light diffusion, allowing the light with uniform luminance to enter the prism sheet 174. As a result, the light with uniform luminance is supplied to the display region 206, which enables the display device 100 to provide high quality display.

Fourth Embodiment

In the First to Third Embodiments, the modes where the protruding portions 120g are formed at the rear vessel 120 are explained. In the present embodiment, a mode is explained where the protruding portion is not provided in the rear vessel 120 but is provided in the front cover 180. An explanation of the structures the same as or similar to those described in the First to Third Embodiments may be omitted.

1. Rear Vessel

Figure 14A:
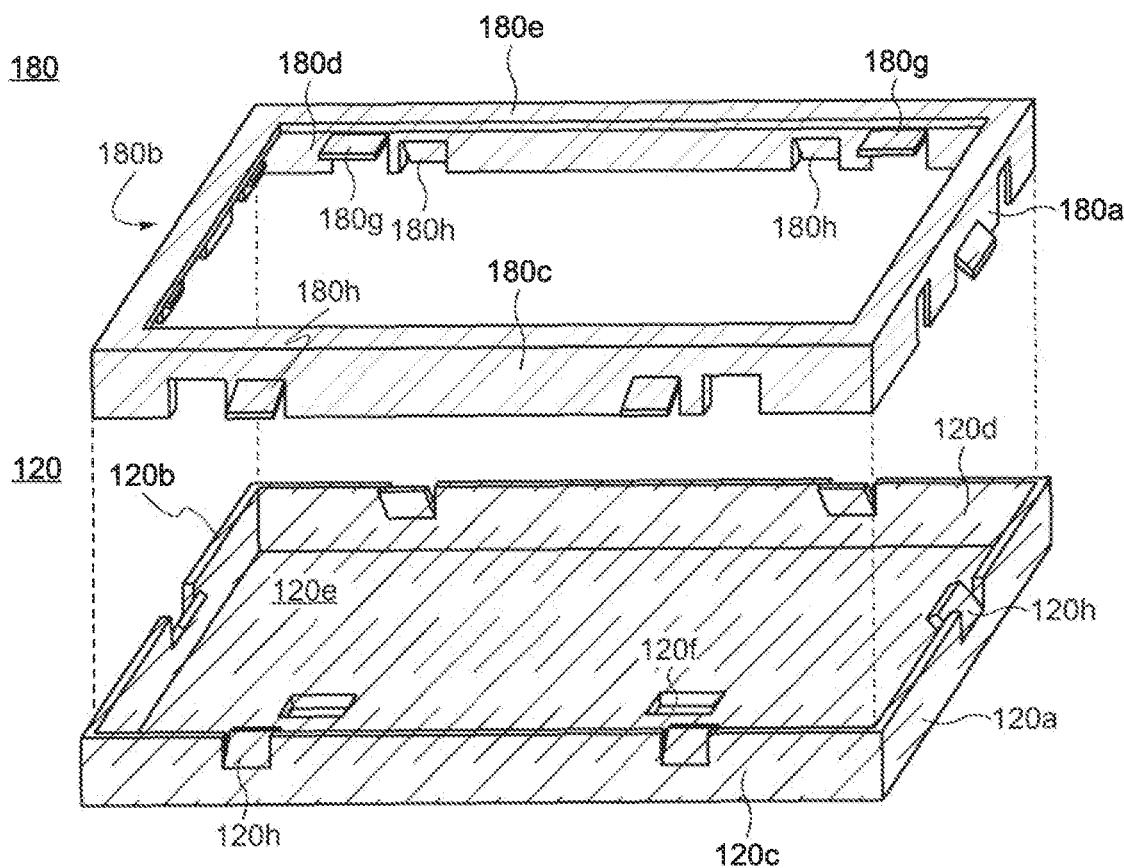
FIG. 14A to FIG. 14C are schematic perspective views of a light source device according to an embodiment of the present invention.

A schematic perspective view of the rear vessel 120 and the front cover 180 is illustrated in FIG. 14A. Similar to the mode described in the First Embodiment, the rear vessel 120 has the side plates 120a to 120d and also has the bottom plate 120e located between the pair of opposing side plates (e.g., the pair of side plates 120a and 120b or the pair of side plates 120c and 120d). The bottom plate 120e is integrated with the side plates 120a to 120d. A flap 120h is provided to at least one of the side plates as a structure to fix the front cover 180 to the rear vessel 120. Similar to the protruding portion 120g, the flap 120h can also be formed by forming a pair of slits 124 in the side plate and bending a part of the side plate between the pair of slits 124 toward the inside of the rear vessel 120. Unlike the protruding portion 120g, an upper surface of the flap 120h may not be parallel to the bottom plate 120e and may be configured to incline from the bottom plate 120e by an angle equal to or more than 60° and less than 90°, equal to or more than 75° and less than 90°, or equal to or more than 80° and less than 90°.

The number of flaps 129h and the arrangement of the flap 120h are arbitrarily determined, and the flap 120h may be formed at at least one side plate. Alternatively, one or more flaps 120h may be formed at each of the opposing side plates. For example, two flaps 120h may be arranged in each of two opposing side plates. Alternatively, one flap 120h may be arranged in one side plate, whereas two flaps 120h may be arranged in the opposing side plate. Alternatively, one or plural flaps 120h may be formed at all of the side plates.

2. Front Cover

Similar to the mode described in the First Embodiment, the front cover 180 also has the side plates 180a to 180d and the bottom plate 180e located between the pair of opposing side plates. The bottom plate 180e is integrated with the side plates 180a to 180d.

At least one protruding portion 180g having a similar structure the protruding portion 120g is formed at at least one side plate of the front cover 180. That is, a part of the side plate is bent to allow the side plate to have the protruding portion 180g extending toward the opposing side plate (here, the side plate 180*c* shown in FIG. 14A) in addition to the cutoff 122 as shown in an enlarged view (FIG. 14B) of a part of FIG. 14A. The protruding portion 180*g* overlaps the bottom plate 120*e* of the rear vessel 120. The protruding portion 180*g* extends toward the opposing side plate so as to be parallel to the upper surface of the bottom plate 120*e* or to incline from the upper surface of the bottom plate 120*e* by an angle equal to or less than ±30°, ±20°, or ±10°.

Although not illustrated, the protruding portion 180*g* can also be formed by forming a pair of slits 124 in the side plate from a side opposite to the bottom plate 180*e* and bending a portion between the slits 124 toward the opposing plate, that is, toward the inside of the front cover 180, similar to the protruding portion 120*g* of the rear vessel 120 of the First and Second Embodiments. As described below, the light-diffusing plate 170, the prism sheet 174, the reflective polarizing plate 176, and the like are accommodated in the front cover 180 in the present embodiment. Hence, the bending may be performed after arranging the light-diffusing plate 170, the prism sheet 174, and the reflective polarizing plate 176 in the front cover 180 in order to stably fix these items.

This formation method allows the protruding portion 180*g* of the front cover 180 to be integrated with the side plate thereof, to have the same material as the side plate thereof, and to have the same composition as the side plate thereof. In addition, an area of an upper surface of the protruding portion 180*g* is substantially the same as the area of the cutoff 122, and a length in the direction in which the side plate extends is the same between the cutoff 122 and the protruding portion 180*g*. Furthermore, a length in the direction in which the protruding portion 180*g* extends toward the opposing plate is the same as the height of the cutoff 122. Moreover, a thickness of the protruding portion 180*g* (a length in the normal direction of the bottom plate 180*e*) and the width of the side plate (a length perpendicular to the direction in which the side plate extends and parallel to the bottom plate 180*e*) are the same as each other.

Figure 14B:
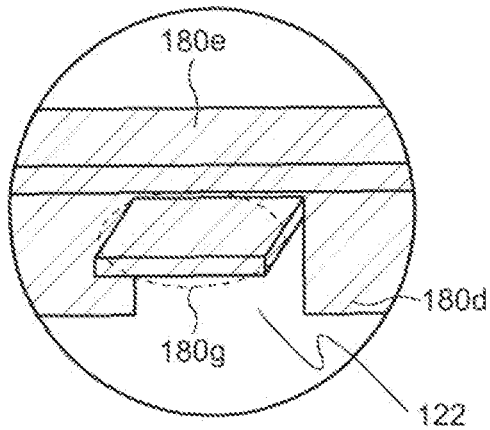
Figure 14C:
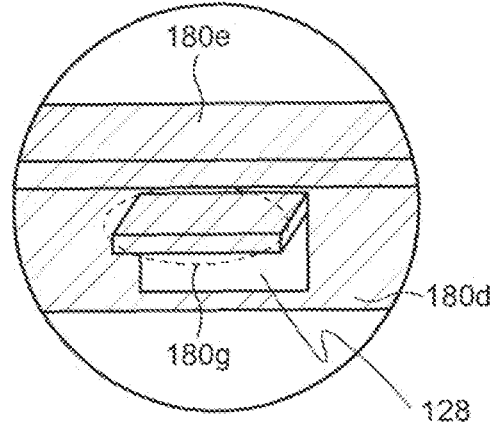

In the example shown in FIG. 14A and FIG. 14B, the side plate has the cutoff 122 under the protruding portion 180*g*. However, the structure of the front cover 180 is not limited thereto. For example, the opening 128 may be formed at the side plate and the protruding portion 180*g* may be formed thereover as shown in FIG. 14C.

Similar to the protruding portion 120*g*, the number of protruding portions 180*g* and the arrangement thereof may be also arbitrarily determined, and one or more protruding portions 180*g* may be arranged in each of two opposing side plates. For example, two protruding portions 180*g* may be arranged in each of two opposing side plates. Alternatively, one protruding portion 180*g* may be arranged in one side plate whereas two protruding portions 180*g* may be arranged in the opposing side plate. Alternatively, one or plural protruding portions 180*g* may be formed at all of the side plates.

Similar to the rear vessels 120, a flap 180*h* is formed at the front cover 180 as a structure to fix the rear vessel 120 to the front cover 180 (FIG. 12A). Similar to the protruding portions 120*g* and 180*g*, the flap 180*h* can also be fabricated by forming a pair of slits 124 in the side plate and bending a part of the side plate between the pair of slits 124 toward the outside of the front cover 180. Unlike the protruding portion 180*g*, an upper surface of the flap 180*h* may not be parallel to the upper surface of the bottom plate 180*e* and may be configured to incline from the bottom plate 180*e* by an angle equal to or more than 60° and less than 90°, equal to or more than 75° and less than 90°, or equal to or more than 80° and less than 90°.

The flap 180*h* is formed at a position overlapping the flap 120*h* of the rear vessel 120. Therefore, the position and the number of the flaps 180*h* are the same as those of the flaps 120*h*.

Figure 15A:
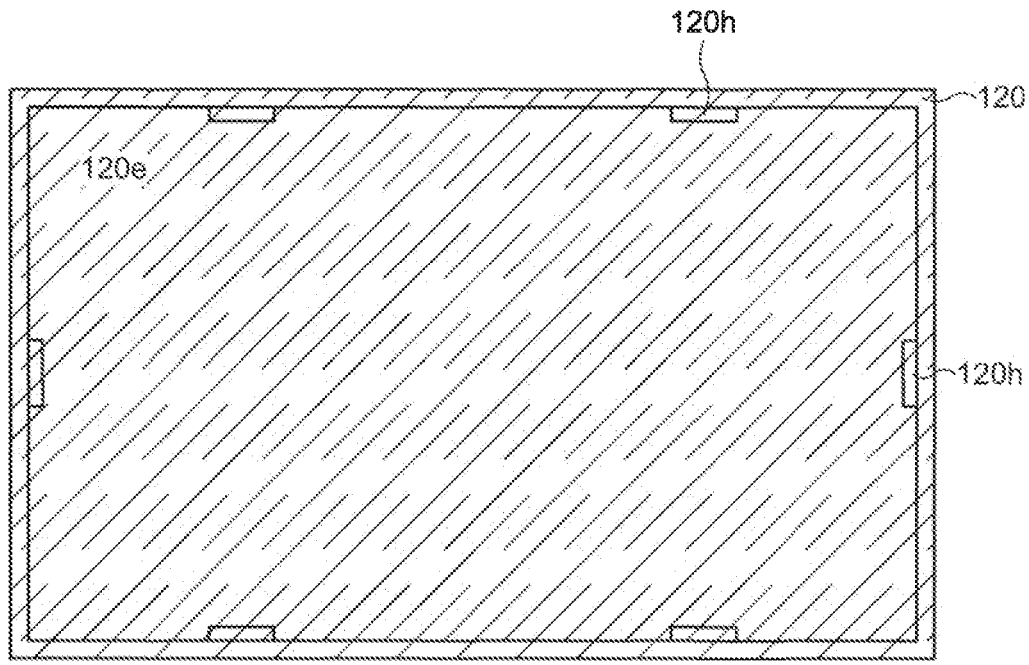
FIG. 15A and FIG. 15B are schematic top views of a light source device according to an embodiment of the present invention.
Figure 15B:
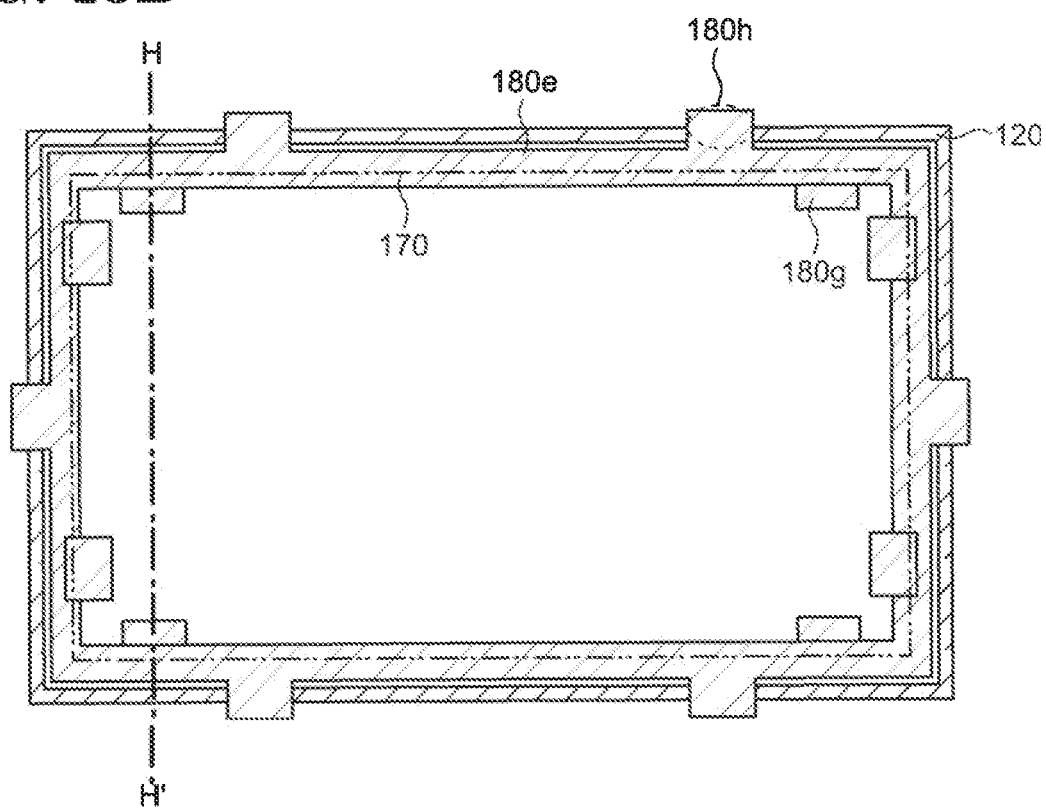
Figure 16A:
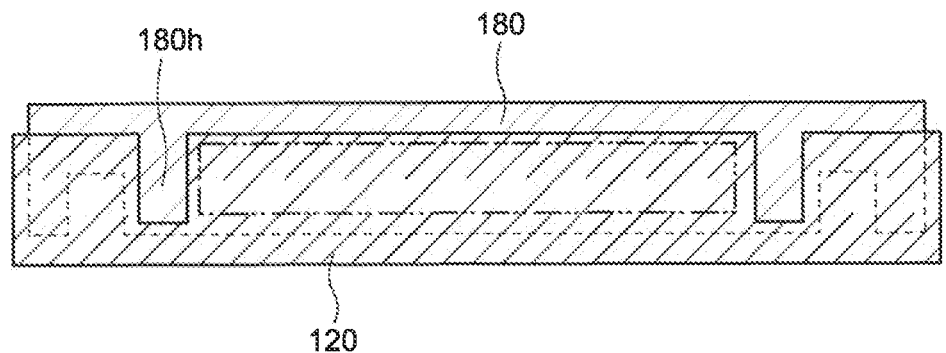
FIG. 16A and FIG. 16B are schematic side views and FIG. 16C is a schematic cross-sectional view of a light source device according to an embodiment of the present invention.
Figure 16B:
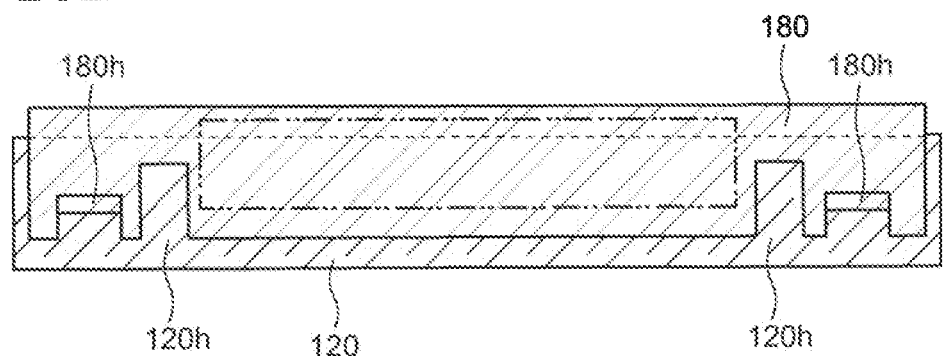

A schematic top view of the rear vessel 120 is shown in FIG. 15A, whereas a schematic top view of the rear vessel 120 and the front cover 180 is illustrated in FIG. 15B. In FIG. 15B, the arrangement of the light-diffusing plate 170 is indicated by a two-dot chain line. As can be understood from these figures, the front cover 180 is accommodated in the rear vessel 120. The flap 120*h* and the flap 180*h* engage to each other, by which the rear vessel 120 and the front cover 180 are fixed. Specifically, as shown in a schematic side view (FIG. 16A) of a state where the front cover 180 is accommodated in the rear vessel 120 and a schematic side view (FIG. 16B) which corresponds to FIG. 16A and can be obtained when this state is observed from the inside of the rear vessel 120, a flat portion of the side plate of the rear vessel 120 in which no flap 120*h* is provided (e.g., a portion surrounded by a two-dot line in FIG. 16A) is arranged outward with respect to the side plate of the front cover 180. At the same time, the flap 120*h* is positioned inward with respect to the front cover 180 (FIG. 16B). On the other hand, a flat portion of the side plate of the front cover 180 where no flap 180*h* is provided (e.g., a portion surrounded by a two-dot chain line in FIG. 16B) is arranged inward with respect to the side plate of the rear vessel 120, while the flap 180*h* is located outward with respect to the side plate of the rear vessel 120 (FIG. 16A). With this mechanism, the rear vessel 120 and the front cover 180 are fixed.

Figure 16C:
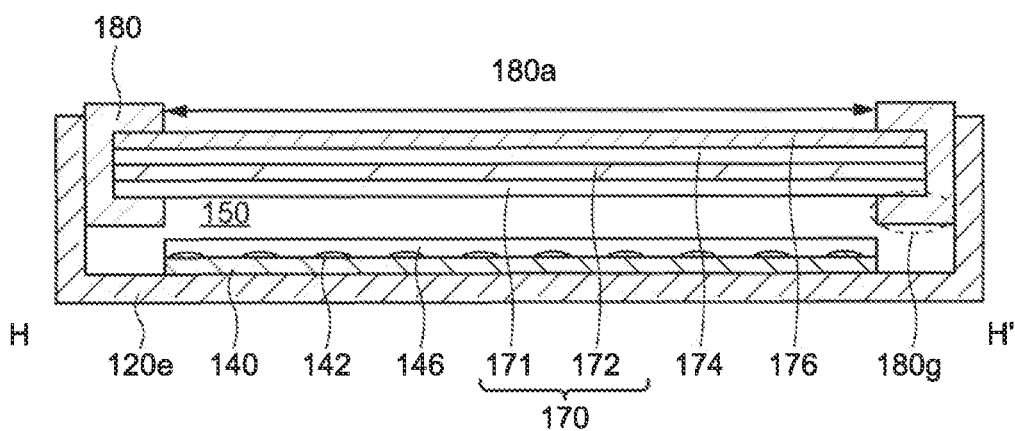

3. Arrangement of the Light-Diffusing Plate and Separation from the Light-Emitting Diode A schematic view of a cross section along a chain line H-H' in FIG. 15B is shown in FIG. 16C. As can be understood from FIG. 15B and FIG. 16C, the light-diffusing plate 170, the prism sheet 174, the reflective polarizing plate 176, and the like are fixed between the protruding portions 180*g* and the bottom plate 180*e* of the front cover 180. Therefore, these items may be arranged before bending the portion between the pair of slits 124 formed at the side plate, and then the protruding portions 180*g* may be formed by bending the portion between the slits 124.

The protruding portions 180*g* are formed so that the distance between the upper surface of the protruding portion 180*g* and the upper surface of the light source substrate 140 is equal to or more than 1 mm and equal to or less than 3 mm or equal to or more than 1.5 mm and equal to or less than 2.5 mm in the state where the rear vessel 120 and the front cover 180 are engaged. With this structure, the space 150 is formed between the light source substrate 140 and the light-diffusing plate 170, and the light from the light-emitting diodes 142 can be spread in the space 150. This effect is combined with the contribution of the light-diffusing plate 170 to the light diffusion to allow the light with uniform luminance to enter the prism sheet 174. As a result, the light with uniform luminance is supplied to the display region 206 to enable the display device 100 to provide high quality display.

Fifth Embodiment

In the present embodiment, another modified example of the rear vessel 120 is explained. An explanation of the structures the same as or similar to those described in the First to Fourth Embodiments may be omitted. In the present embodiment, the rear vessel 120 is different from the rear vessel 120 of other embodiments in that the protruding portion 120g provided to the rear vessel does not overlap the bottom plate 120e.

Figure 17A:
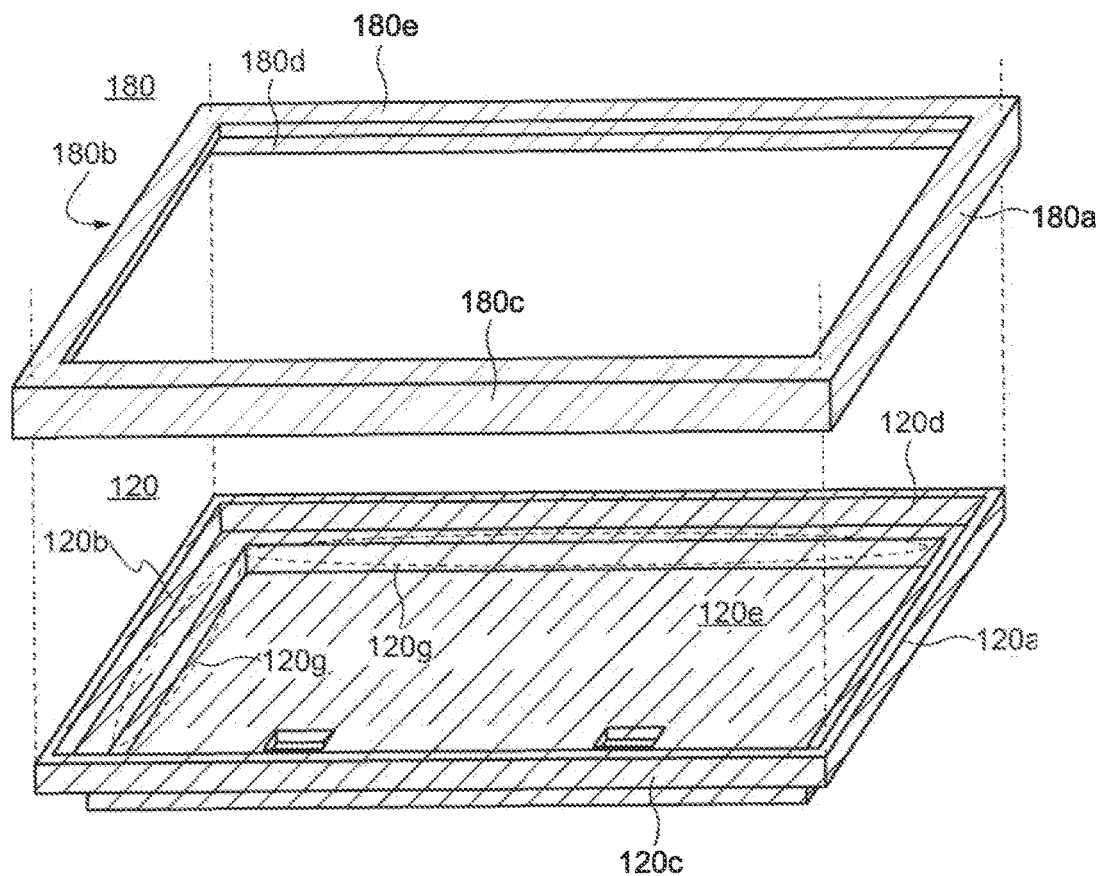
FIG. 17A and FIG. 17B are respectively schematic perspective and top views of a light source device according to an embodiment of the present invention.
Figure 17B:
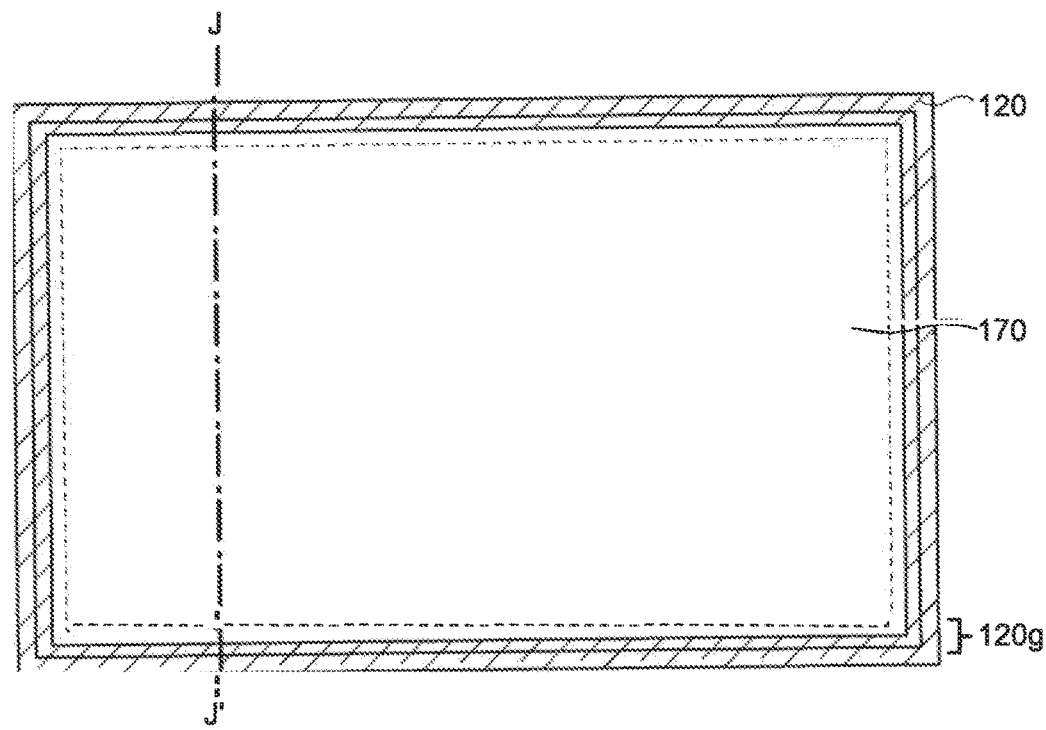
Figure 18A:
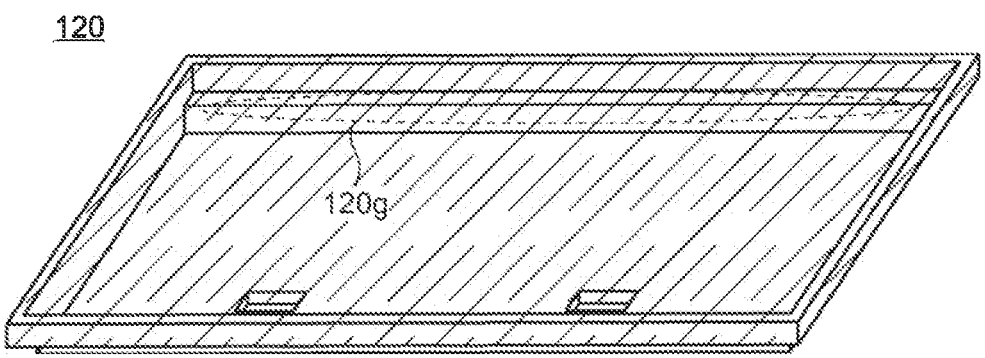
FIG. 18A and FIG. 18B are respectively schematic perspective and top views of a light source device according to an embodiment of the present invention.

A schematic perspective view of the rear vessel 120 and the front cover 180 is shown in FIG. 17A, whereas a schematic top view of a state where the light-diffusing plate 170 is arranged in the rear vessel 120 is illustrated in FIG. 17B. As demonstrated in FIG. 17A, the cutoff 122 and the opening 128 are not formed at the rear vessel 120 of the present embodiment, but the protruding portions 120g are provided to at least a pair of side plates opposing each other. In the side plate in which the protruding portion 120g is formed, the protruding portion 120g is fabricated in the whole of the side plate. The protruding portion 120g is prepared so that the upper surface thereof is parallel to the upper surface of the bottom plate 120e or inclines from the upper surface of the bottom plate 120e by an angle equal to or less than ±30°, ±20°, or ±10°. The protruding portions 120g may be formed at all of the side plates as shown in FIG. 17A. Alternatively, the protruding portions 120g may be formed at the side plates opposing each other, and no protruding portion 120g may be formed at the other pair of side plates as shown in FIG. 18A. When each side plate is provided with the protruding portion 120g, the protruding portions 120g may be prepared so that the upper surfaces of the protruding portions 120g formed at all of the side plates exist in the same plane.

Figure 18B:
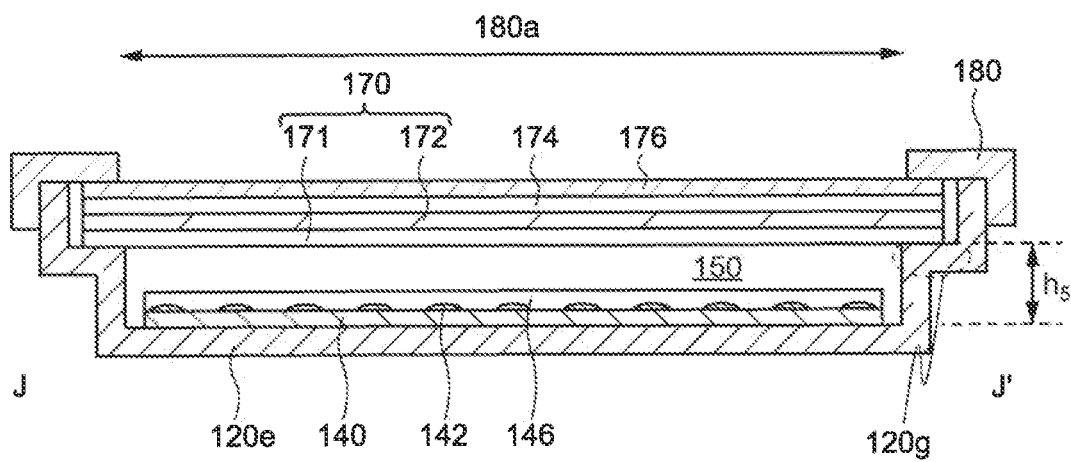

A schematic view of a cross section along a chain line J-J' in FIG. 17B is shown in FIG. 18B. As shown in FIG. 18B, the protruding portions 120g do not overlap the bottom plate 120e but overlap the bottom surface 180e of the front cover 180. The light source substrate 140 and the plurality of light-emitting diodes 142 arranged thereover are disposed over the bottom plate 120e so as to be sandwiched by the pair of protruding portions 120g opposing each other. The light-diffusing plate 170, the prism sheet 174, the reflective polarizing plate 176, and the like are arranged over the protruding portions 120g to overlap the protruding portions 120g (see FIG. 17B). The protruding portions 120g are configured so that a value obtained by subtracting the thickness of the light source substrate 140 from a height $h_5$ thereof (i.e., a distance from the upper surface of the bottom plate 120e to the upper surface of the protruding portion 120g) is equal to or more than 1 mm and equal to or less than 3 mm or equal to or more than 1.5 mm and equal to or less than 2.5 mm. The rear vessel 120 with this structure can also be prepared by cutting or pressing a metal plate.

The aforementioned structure provides the space 150 between the light source substrate 140 and the light-diffusing plate 170, by which the light from the light-emitting diodes 142 can be spread. This effect is combined with the contribution of the light-diffusing plate 170 to the light diffusion to allow the light with uniform luminance to enter the prism sheet 174. As a result, the light with uniform luminance is supplied to the display region 206 to enable the display device 100 to perform high quality display.

Sixth Embodiment

In the present embodiment, a mode is explained in which a spacer 148 is arranged in the rear vessel 120 instead of the protruding portion 120g. An explanation of the structures the same as or similar to those described in the First to Fifth Embodiments may be omitted.

Figure 19A:
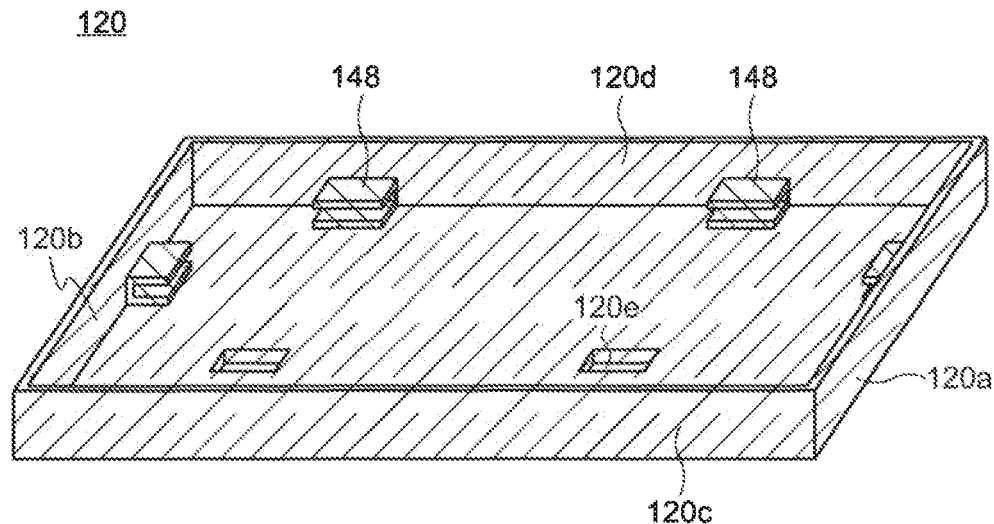
FIG. 19A and FIG. 19B are respectively schematic perspective and top views of a light source device according to an embodiment of the present invention.
Figure 19B:
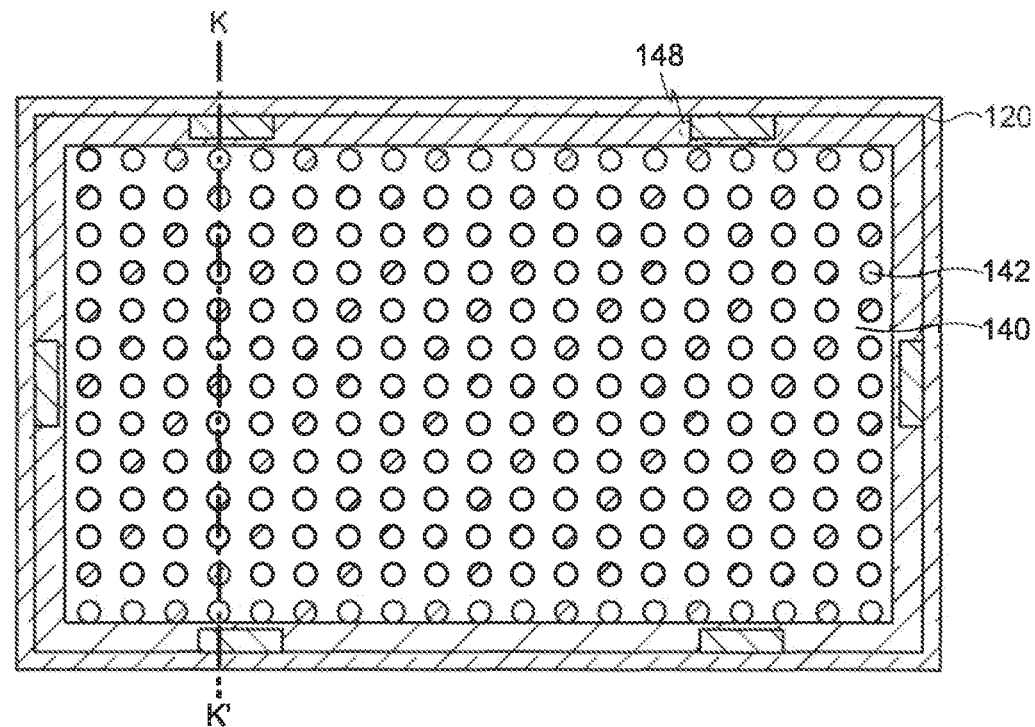
Figure 20A:
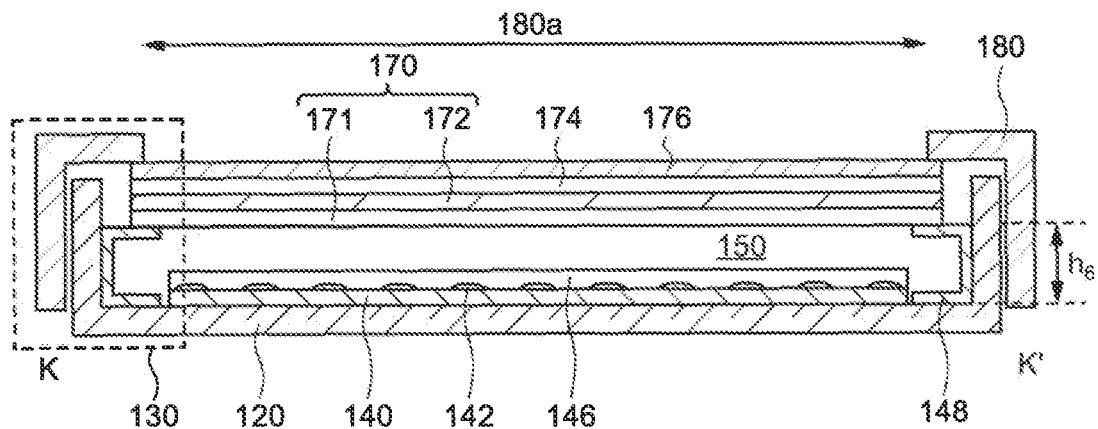
FIG. 20A to FIG. 20E are schematic cross-sectional views of a light source device according to an embodiment of the present invention.

A schematic perspective view of the rear vessel 120 and at least one spacer 148 accommodated in the rear vessel 120 is shown in FIG. 19A, whereas a schematic top view of a state where the light source substrate 140 and the light-emitting diodes 142 are further arranged to the structure of FIG. 19A is illustrated in FIG. 19B. FIG. 20A is a schematic view of a cross section along a chain line K-K' in FIG. 19B. As described above, the light-diffusing plate 170 is arranged to be spaced away from the light-emitting diodes 142, and the spacer 148 for realizing this structure is arranged in the rear vessel 120 in the light-source device 110.

As demonstrated in FIG. 19B and FIG. 20A, the spacer 148 is provided between the bottom plate 120e and the light-diffusing plate 170 of the rear vessel 120, and at least a part of the spacer 148 overlaps the light-diffusing plate 170. The light source substrate 140 is arranged so as not to overlap the spacer 148. The number of spacers 148 and the arrangement thereof are not limited, and at least one pair of spacers 148 may be arranged so as to sandwich the light source substrate 140. For example, one or plural spacers 148 may be arranged along each of the pair of side plates opposing each other. Alternatively, one or plural spacers 148 may be arranged along one pair of side plates and the other pair of side plates. In this case, the light source substrate 140 is sandwiched by the plurality of spacers 148.

Figure 20B:
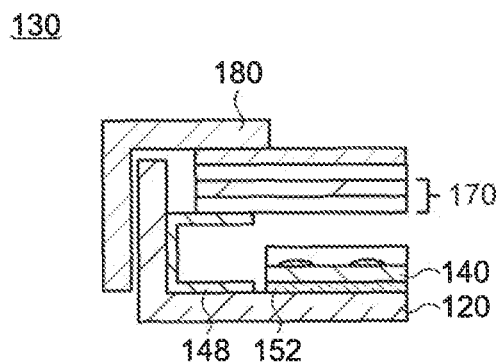
Figure 20C:
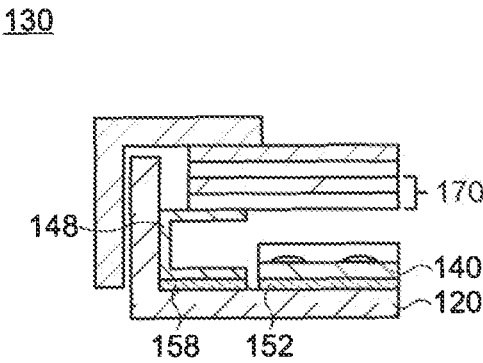

As shown in FIG. 20A, the spacer 148 has a U shape with a cross section having an opened shape, and the spacer 148 is arranged so that the opening portion of this shape faces the light source substrate 140. As demonstrated in enlarged views of the region 130 in FIG. 20A (FIG. 20B to FIG. 20E), the spacer 148 may be arranged so as to be in contact with the bottom plate 120e and the side plate of the rear vessel 120 (FIG. 20B) or may be fixed to the bottom plate 120e of the rear vessel 120 through an adhesive layer 158. A height $h_6$ of the spacer 148 is adjusted so that the light-diffusing plate 170 is spaced away from the light-emitting diodes 142. Specifically, the spacer 148 is configured so that a value obtained by subtracting the thickness of the light source substrate 140 from the height $h_6$ is equal to or more than 1 mm and equal to or less than 3 mm or equal to or more than 1.5 mm and equal to or less than 2.5 mm.

Figure 20D:
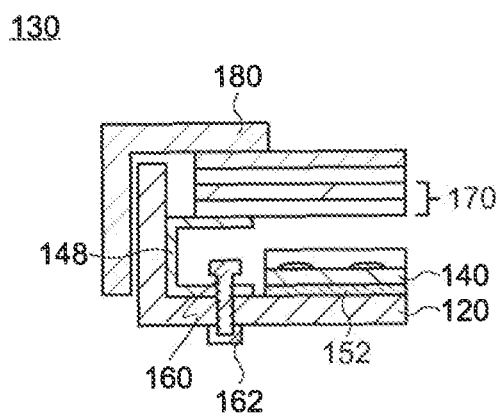
Figure 20E:
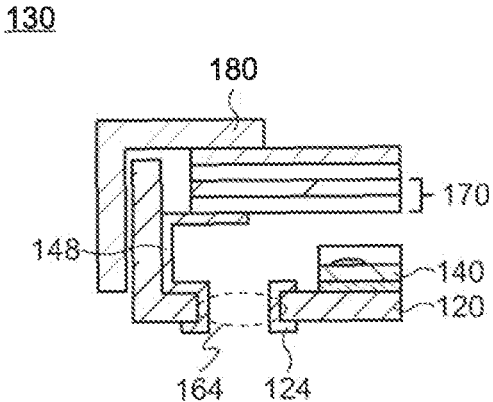

Alternatively, the spacer 148 may be fixed to the bottom plate 120e using a screw 160 or the combination of the screw 160 and a nut 162 as shown in FIG. 20D. Alternatively, an opening 164 may be formed at the bottom plate 120e, and the spacer 148 may be arranged so that a part of the spacer 148 extends over a bottom surface of the bottom plate 120e through the opening 164 (FIG. 20E). Although not illustrated, these fixing methods and the arranging methods may be appropriately combined.

Arrangement of the spacer 148 provides a space 150 between the light source substrate 140 and the light-diffusing plate 170, and the highly directive light from the light-emitting diodes 142 can be spread. This effect is combined with the contribution of the light-diffusing plate 170 to the light diffusion to allow the light with uniform luminance to enter the prism sheet 174. As a result, the light with uniform luminance is supplied to the display region 206 to enable the display device 100 to perform high quality display.

The aforementioned modes described as the embodiments of the present invention can be implemented by appropriately combining to with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by the modes of the aforementioned embodiments is achieved by the present invention if the effect is obvious from the description in the specification or readily conceived by persons ordinarily skilled in the art.

REFERENCES SIGNS LIST

100: Display device, 110: Light source device, 120: Rear vessel, 120a: Side plate, 120c: Side plate, 120d: Side plate, 120e: Bottom plate, 120f: Opening, 120g: Protruding portion, 120h: Flap, 122: Cutoff, 124: Slit, 126: Light-shielding film, 128: Opening, 130: Region, 132: Region, 140: Light source substrate, 142: Light-emitting diode, 144: Overcoat, 148: Spacer, 150: Space, 152: Adhesive layer, 154: Adhesive layer, 156: Buffer material, 158: Adhesive layer, 162: Nut, 164: Opening, 170: Light-diffusing plate, 171: Light-diffusing layer, 172: Wavelength-converting layer, 174: Prism Sheet, 176: Reflective polarizing plate, 180: Front cover, 180a: Side plate, 180b: Side plate, 180c: Side plate, 180e: Bottom plate, 180f: Opening, 180g: Protruding portion, 180h: Flap, 200: Liquid crystal display module, 202: Array substrate, 204: Pixel, 206: Display region, 208: Scanning-line driver circuits, 210: Signal-line driver circuit, 212: Terminal, 214: Counter substrate, 216: Polarizing plate, 218: Polarizing plate, 220: Touch sensor, 222: First touch electrode, 224: Second touch electrode

What is claimed is:

1. A light source device comprising:
a rear vessel;
a front cover located over and overlapping the rear vessel; and
a light source substrate, a plurality of light-emitting diodes, and a light-diffusing plate accommodated between the rear vessel and the front cover, wherein
the plurality of light-emitting diodes is located over the light source substrate,
the light-diffusing plate is located over, overlaps, and is spaced away from the plurality of light-emitting diodes,
the rear vessel and the front cover each include a bottom plate and a side plate integrated with the bottom plate,
a part of the side plate is bent to form a protruding portion overlapping the bottom plate in at least one of the rear vessel and the front cover, and
the light-diffusing plate is located over and overlaps the protruding portion.

2. The light source device according to claim 1, wherein an upper surface of the protruding portion is parallel to a bottom surface of the rear vessel or the front cover.

3. The light source device according to claim 1, wherein the side plate integrated with the protruding portion has a pair of flat portions adjacent to the protruding portion and sandwiches the protruding portion, and
the side plate integrated with the protruding portion has a cutoff or an opening between the pair of flat portions.

4. The light source device according to claim 1, wherein the protruding portion is formed at the side plate of the rear vessel, and
a thickness of the protruding portion is the same as a thickness of the side plate of the rear vessel.

5. The light source device according to claim 3, wherein the protruding portion is formed at the side plate of the rear vessel, and
the cutoff or the opening is located over the protruding portion.

6. The light source device according to claim 3, wherein the protruding portion is formed at the side plate of the rear vessel, and
the cutoff or the opening is located under the protruding portion.

7. The light source device according to claim 3, wherein the protruding portion is formed at the side plate of the rear vessel, and
the side plate of the front cover exposes at least a part of the cutoff or the opening.

8. The light source device according to claim 3, wherein the protruding portion is formed at the side plate of the rear vessel, and
an area of an upper surface of the protruding portion is substantially the same as an area of the cutoff or the opening.

9. The light source device according to claim 1, wherein the protruding portion is formed at the side plate of the rear vessel, and
a part of the bottom plate of the rear vessel is exposed from the protruding portion outside of the rear vessel.

10. The light source device according to claim 9, wherein the protruding portion has a curved shape in a plane parallel to a bottom surface of the rear vessel.

11. The light source device according to claim 9, wherein the protruding portion has a plurality of linear portions in a plane parallel to a surface of the bottom plate of the rear vessel.

12. The light source device according to claim 1, wherein the protruding portion is formed at the front cover, and
a thickness of the protruding portion is the same as a thickness of the front cover.

13. The light source device according to claim 3, wherein the protruding portion is formed at the side plate of the front cover, and
the cutoff or the opening is located over the protruding portion.

14. The light source device according to claim 3, wherein the protruding portion is formed at the side plate of the front cover, and
the cutoff or the opening is located under the protruding portion.

15. The light source device according to claim 3, wherein the protruding portion is formed at the side plate of the front cover, and
the side plate of the rear vessel exposes at least a part of the cutoff or the opening.

16. The light source device according to claim 3, wherein the protruding portion is formed at the side plate of the front cover, and
an area of the protruding portion is substantially the same as an area of the cutoff or the opening.

17. The light source device according to claim 1, wherein the rear vessel is accommodated in the front cover.

18. The light source device according to claim 1, wherein the front cover is accommodated in the rear vessel.

19. The light source device according to claim 18, wherein
the side plates of the rear vessel and the front cover each have a pair of slits,
the rear vessel has a flap formed by bending a part of the side plate between the pair of slits,
the front cover has a flap formed by bending a part of the side plate between the pair of slits, and
the flap of the rear vessel and the flap of the front cover are respectively accommodated in the front cover and the rear vessel.

20. A light source device comprising:
a rear vessel comprising a bottom plate and first to fourth side plates integrated with the bottom plate;
a pair of spacers in the rear vessel;
a light source substrate accommodated in the rear vessel and sandwiched by the pair of spacers;
a plurality of light-emitting diodes over the light source substrate; and
a light-diffusing plate over the pair of spacers and the plurality of light-emitting diodes, wherein
the pair of spacers has a height larger than a thickness of the light-diffusing plate.

* * * * *